United States Patent
Bergstrom

(10) Patent No.: US 10,225,619 B2
(45) Date of Patent: *Mar. 5, 2019

(54) METHOD AND SYSTEM FOR ADAPTIVE VIRTUAL BROADCASTING OF DIGITAL CONTENT

(71) Applicant: SYSTEM73, INC., Dallas, TX (US)

(72) Inventor: Mattias Bergstrom, Puerto de la Cruz (ES)

(73) Assignee: SYSTEM73, INC., Christiansted (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,826

(22) Filed: Aug. 16, 2017

(65) Prior Publication Data

US 2017/0347157 A1    Nov. 30, 2017

Related U.S. Application Data

(63) Continuation of application No. 14/848,268, filed on Sep. 8, 2015, now Pat. No. 9,769,536.
(Continued)

(51) Int. Cl.
*H04N 21/647* (2011.01)
*H04L 12/26* (2006.01)
(Continued)

(52) U.S. Cl.
CPC ....... *H04N 21/64738* (2013.01); *H04L 12/18* (2013.01); *H04L 12/1886* (2013.01);
(Continued)

(58) Field of Classification Search
CPC . H04L 12/18; H04L 12/2671; H04L 12/2673; H04L 12/2676; H04L 43/0882;
(Continued)

(56) References Cited

U.S. PATENT DOCUMENTS 7,388,841 B2   6/2008  Shao et al.
2003/0061619 A1   3/2003  Giammaressi
(Continued)

FOREIGN PATENT DOCUMENTS

WO   2014173704 A1   10/2014

OTHER PUBLICATIONS

Zhu et al.; "Dynamic Overlay Routing Based on Available Bandwidth Estimation: A Simulation. Study;" Computer Networks; (2006); vol. 50; pp. 742-762.
(Continued)

*Primary Examiner* — Omar S Parra
(74) *Attorney, Agent, or Firm* — Mayer Brown LLP

(57) ABSTRACT

The virtual broadcast system of the present invention optimizes the routing of digital content among nodes along overlay networks that are dynamically reconfigured based upon forecasts of frequently-changing congestion levels of component interconnections within an underlying network. In the context of delivering streaming video over the Internet to large numbers of concurrent users, the present invention makes efficient use of the limited capacity of congested ASN peering points by employing deep learning techniques to forecast congestion levels across those ASN peering points and, based on those forecasts, to optimize the routing of video content along dynamically reconfigured overlay networks. The virtual broadcast system handles unscheduled as well as scheduled events, streams live as well as prerecorded events, and streams those events in real time with minimal delay in a highly scalable fashion that maintains a consistent QoE among large numbers of concurrent viewers.

16 Claims, 4 Drawing Sheets

Related U.S. Application Data

(60) Provisional application No. 62/096,938, filed on Dec. 26, 2014.

(51) Int. Cl.

| | | |
|---|---|---|
| *H04L 29/06* | (2006.01) | |
| *H04N 21/25* | (2011.01) | |
| *H04N 21/61* | (2011.01) | |
| *H04L 12/18* | (2006.01) | |
| *H04L 12/729* | (2013.01) | |
| *H04L 12/911* | (2013.01) | |
| *H04L 12/24* | (2006.01) | |
| *H04L 12/707* | (2013.01) | |
| *H04L 12/715* | (2013.01) | |
| *H04L 12/721* | (2013.01) | |
| *H04L 12/751* | (2013.01) | |
| *H04L 12/801* | (2013.01) | |

(52) U.S. Cl.
CPC ...... *H04L 41/0816* (2013.01); *H04L 43/0882* (2013.01); *H04L 43/0888* (2013.01); *H04L 43/0894* (2013.01); *H04L 45/125* (2013.01); *H04L 47/823* (2013.01); *H04L 65/4076* (2013.01); *H04L 65/80* (2013.01); *H04N 21/251* (2013.01); *H04N 21/6125* (2013.01); *H04L 45/02* (2013.01); *H04L 45/04* (2013.01); *H04L 45/22* (2013.01); *H04L 45/64* (2013.01); *H04L 45/70* (2013.01); *H04L 47/127* (2013.01)

(58) Field of Classification Search
CPC ....... H04L 45/02; H04L 45/04; H04L 45/125; H04L 45/22; H04L 45/64; H04L 45/70; H04L 47/127; H04L 47/823; H04L 65/4076

See application file for complete search history.

(56) References Cited

U.S. PATENT DOCUMENTS

| | | |
|---|---|---|
| 2008/0059631 A1 | 3/2008 | Bergstrom et al. |
| 2008/0263130 A1 | 10/2008 | Michalowitz et al. |
| 2013/0287035 A1 | 10/2013 | Scholl |
| 2013/0305299 A1 | 11/2013 | Bergstrom et al. |

OTHER PUBLICATIONS

European Search Report and the Annex to the European Search Report received in European Application No. 15202716 and dated Apr. 26, 2016 (19 pages).

Jain et al.; "Path Selection Using Available Bandwidth Estimation in Overlay-Based Video Streaming;" Networking 2007; vol. 4479 of the Series Lecture Notes in Computer Science; pp. 628-639.

Lee et al.; "Bandwidth-Aware Routing in Overlay Networks;" INFOCOM 2008; The 27th Conference on Computer Communications; IEEE; pp. 2405-2413.

Zhang et al; "Dynamic Overlay Routing Based on Active Probing Measurements: An Emulation Study," Optical Society of America; (2009); 2 pages.

International Search Report of PCT/IB2015/0026 dated May 4, 2016 (5 pages).

Written Opinion received in PCT/IB2015/002604 and dated May 4, 2016 (15 pages.).

Extended Search Report received in EP 17186964.7 and dated Sep. 27, 2017 (15 pages).

METHOD AND SYSTEM FOR ADAPTIVE VIRTUAL BROADCASTING OF DIGITAL CONTENT

CROSS-REFERENCE TO RELATED APPLICATIONS

This application is a continuation of U.S. patent application Ser. No. 14/848,268, filed on Sep. 8, 2015, which claims priority to U.S. provisional patent application Ser. No. 62/096,938 filed Dec. 26, 2014, the disclosure of which are hereby incorporated by reference as if fully set forth herein.

BACKGROUND

Field of Art

The present invention relates generally to an overlay network architecture for delivering digital content among nodes of an underlying network, and more particularly to a virtual broadcast system that optimizes the routing of digital content among nodes along overlay networks that are dynamically reconfigured based upon forecasts of frequently-changing levels of congestion at component interconnections within the underlying network.

Description of Related Art

Network Congestion

As wired and wireless network traffic continues to expand exponentially, finite capacity of the shared links or interconnections among components within a network is becoming an increasingly more relevant and troubling problem. Moreover, because the level of congestion at these shared links is dynamic and subject to a great deal of volatility as network traffic ebbs and flows, such congestion is difficult to measure at any given time, and particularly difficult to predict even on a near-term basis.

This problem is somewhat analogous to that of traffic congestion at the intersecting junctions of shared roads and freeways in increasingly populated areas. While existing GPS navigation and traffic control systems measure current congestion at these junctions, and calculate optimal paths to reroute individual drivers around such congestion, their ability to predict an optimal route in advance for any particular driver is hampered by the volatile nature of traffic congestion.

When a single company such as Netflix accounts for over one-third of peak Internet traffic, companies that deliver digital information over the Internet concurrently (particularly large amounts of linear data) must somehow address the increasingly volatile nature of Internet congestion. Similarly, as mobile voice and data usage soars, the limited availability of regulated RF spectrum is of particular concern to companies developing high-bandwidth mobile applications.

While a specific application of the present invention is described herein in the context of delivering streaming video over the Internet to large numbers of concurrent users, the principles of the present invention apply equally in numerous other contexts where limited capacity of shared links among network components constrains the routing of any type of information that can be converted into a digital format (e.g., audio, images, 3D models, etc.). Other potential applications of the present invention include, for example, VoIP, corporate videoconferencing, virtual reality, multi-player gaming, and a variety of other bandwidth-intensive applications (relative to the level of congestion of shared links within an underlying network at any given point in time).

As will be discussed in greater detail below, the present invention does not "cure" the problem of limited capacity or "network congestion" at component links within an underlying network such as the Internet, but instead makes efficient use of that limited capacity by monitoring and analyzing network traffic across those links to optimize the routing of digital content among nodes of overlay networks that are dynamically reconfigured based on forecasts of congestion levels at those links.

Video Streaming Events

Since the advent of the Internet and IP-based routing, many approaches to streaming video over the Internet have emerged. Before discussing their relative advantages and disadvantages, it is helpful to step back and consider the problem being addressed. To distribute video content over the Internet, it must first be captured and digitized. We can characterize the video content as an "event" that is captured "live" (or generated digitally) and distributed over the Internet. References herein to video events include the capture or generation of both video and audio, as well as any associated metadata.

Video events can either be scheduled or unscheduled. For example, the "Super Bowl" is a scheduled event in that the time of its occurrence is known in advance, whereas other events (e.g., natural disasters, a toddler's first steps, or even video on demand—"VOD") are unscheduled in that they may occur with little or no advance warning.

Video content may be captured in its entirety to generate a digitized video file before it is distributed over the Internet as any other type of file is transferred (e.g., via an "FTP" or file transfer protocol). However, such a "file transfer" approach imposes a delay on the recipient's viewing (playing) of the video content—i.e., the recipient must wait until the entire file has been transferred before viewing the video content. Given the relatively large file sizes of digitized video, this delay can be significant.

Video content is therefore often "streamed" to users so they can continuously receive and view the content while it is still being sent. In essence, the video content is divided into an ordered linear stream of small files or "video segments" (e.g., 1 to 10 seconds in length) that are delivered to users who can start viewing them as they are received. To view a continuous stream of video content without delay or jitter, each video segment must be played at regular intervals—e.g., 30 frames per second (fps). Note, however, that video segments need not be received at regular intervals, provided that each segment is received before the playback of the prior segment has concluded.

Whether an event is scheduled or unscheduled, it can be streamed "live" (i.e., as the event occurs) or "pre-recorded" for streaming any time after the occurrence of the event. For example, the Super Bowl could be captured and streamed live as the event occurs, or pre-recorded for streaming at a later time.

Finally, whether an event is scheduled or unscheduled, and whether it is pre-recorded or streamed live as it occurs, it can be streamed in "real time" (i.e., with a largely imperceptible delay from sender to receiver) or "delayed" in transit for seconds or even minutes. For example, viewers of a television program (e.g., a baseball game) that is streamed over the Internet, but not in real time, might experience the streamed event at different times from one another, or at different times from viewers watching the same program broadcast via cable or satellite. Such delays (particularly if more than a few seconds) may diminish a user's "quality of experience" (QoE)—i.e., a user-centric or application-level view of quality, as contrasted with a "quality of service" (QoS), which is a measure of performance based on network-centric metrics (e.g., packet delay, packet loss, or jitter caused by routers or other network resources).

For example, social interaction among viewers may be constrained (wholly apart from jitter or other video artifacts) due to the fact that viewers experience the same event at different times. This is particularly problematic today when so many events (scheduled or unscheduled) are communicated in real time in so many different ways—from broadcast radio or television to social media and other Internet services, accessible via mobile phones and desktop and laptop computers, as well as via a constantly evolving domain of consumer electronic devices.

It is therefore desirable for a video streaming system to handle unscheduled as well as scheduled events, to stream live as well as pre-recorded events, and to stream those events in real time with minimal delay in order to provide viewers with a consistent QoE. Moreover, as the number of concurrent viewers of a streaming video event increases, maintaining a consistent QoE becomes a formidable problem. For that reason, scalability is a key design goal of any such system.

Despite recent advancements in video streaming technology, the historical "ad hoc" evolution of the infrastructure of the Internet still presents significant obstacles to Internet-based video streaming, not the least of which is an inconsistent QoS, which leads to network congestion at times and locations across the Internet that are difficult to predict. While a key objective of the present invention is to maintain a consistent QoE for viewers of streaming video events, this objective is constrained by network congestion across the Internet which ultimately cannot be eliminated.

Underlying Internet Architecture

Beginning with ARPANET (the earliest packet-switching network to implement the Internet protocol suite, or TCP/IP), and later NSFNET, the Internet "backbone" was designed to be a redundant "network of networks" (i.e., the Internet) that afforded reliability or "resiliency" by decentralizing control and providing alternative communication (routing) paths for information to reach its desired destination. Yet, with packets following different paths among routers and other shared network resources, maintaining a consistent QoS or QoE over the Internet remains an extremely difficult problem.

As the Internet backbone evolved and was privatized, redundancy and overlap developed between traditional backbone networks and those owned by long-distance telephone carriers. For the purposes of this specification, we distinguish large "public" networks that provide data to customers directly, or via other smaller "internet service provider" (ISP) networks, from large "private" backbone networks that carry data only among themselves, or serve as a conduit between large ISPs, but do not directly provide data to customers. In either case, these large public and private networks are typically implemented as "fiber rings" interconnected via fiber-optic trunk lines—i.e., multiple fiber-optic cables bundled together to increase network capacity.

For routing purposes, the largest network providers that carry the heaviest network traffic (e.g., large ISPs and private backbone networks) are assigned blocks of IP routing prefixes known as "autonomous systems" (AS), each of which is assigned an "autonomous system number" (ASN). We refer to each of the large fiber rings owned by these companies as an ASN. The number of ASNs has grown dramatically in recent years, from approximately 5000 ASNs fifteen years ago to over 50,000 ASNs across the world today. As alluded to above, many large network providers also own backbone fiber-ring networks (i.e., private ASNs) that do not service customers, but may be connected to their own "public ASNs" or those owned by others.

Because different companies own ASNs, they enter into agreements with one another to facilitate the routing of Internet traffic across ASNs and throughout the global Internet. Each ASN utilizes a bank of routers often referred to as a "peering point" to control access to another ASN, employing a routing protocol known as the "border gateway protocol" or BGP. Any given ASN may employ multiple peering points to connect to multiple different ASNs. Interconnected ASNs may be geographically adjacent, or may be far apart, connected via long fiber trunks spanning great distances (e.g., across countries or even oceans). Public ASNs may also be interconnected via "private ASNs" or backbone networks.

Monitoring QoS within and across ASNs is extremely difficult. Large network providers maintain much of the routing and performance information within their ASNs (including dynamic congestion metrics) as proprietary. While the "Open Message Format" (of the current BPG Version 4) provides for a "data dump" of certain information when a TCP/IP connection to a BGP router is established, this mechanism is not terribly useful as a practical matter. Many BGP routers do not support the Open Message Format, while others simply turn it off. Moreover, the information is typically 5 minutes out of date, which is a relatively long time given how frequently congestion levels change across the Internet.

Because such a large amount of Internet traffic flows across the relatively high-bandwidth peering points interconnecting ASNs, these peering points are often key "bottlenecks" or sources of much of the congestion across the Internet at any given time, apart from the "last mile" problem within an ASN (i.e., congestion across the relatively lower-bandwidth wired and wireless connections between end users and their "gateway" ISPs).

For example, as the traffic load across an ASN peering point increases, the routers in the ASNs on each side of the peering point become congested. In other words, these routers experience high utilization rates of RAM, CPU and other limited-capacity shared resources. Increased demand on these resources reduces performance (e.g., bit rates) across these peering points, and eventually may lead to lost data packets. Because network traffic across the Internet is not centrally controlled, it is difficult to predict the frequently changing levels of "peering point congestion" across the Internet at any given time.

If one cannot guarantee a consistent QoS within and across ASNs, it becomes very difficult to maintain a consistent QoE for viewers of streaming video events. Any system that streams video over the Internet is subject to unreliability and constantly changing levels of congestion of shared routers, particularly at ASN peering points through which so much Internet traffic flows. This problem is exacerbated when streaming video to large numbers of concurrent viewers across the Internet, and in particular across these ASN peering points.

Existing Video Streaming Approaches

Various approaches to streaming video over the Internet have evolved over the past few decades, with a vast array of terminology employed to characterize and distinguish different techniques for generating overlay network topologies (on top of the Internet) and delivering video content among network nodes along these overlay networks. In comparing different approaches, it is helpful to return briefly to the GPS navigation analogy, and consider the factors which affect the time required to travel between any two points or nodes—i.e., distance, speed and congestion (typically addressed by rerouting along a different path).

In the context of routing packets on the Internet, distance (or geographic proximity) is not of direct relevance because packets travel near the speed of light. Speed, however, is affected by the number of stops or roadblocks encountered along a route, or in this context the number of "hops" encountered at intermediate routers between two nodes. Thus, two nodes can be said to be "nearby" each other (in "network proximity") if they are only a relatively few hops apart, regardless of their geographic proximity. Congestion at intermediate nodes along the path between two nodes affects the overall travel time, and can be addressed by dynamically rerouting traffic—i.e., dynamically reconfiguring the overlay networks that determine the path between two nodes. As will be discussed below, these factors serve to illustrate key distinctions among different approaches to streaming video over the Internet.

The most common method of delivering video outside of the Internet is to "broadcast" a video stream (e.g., a television program) from a "point of origin" to all destination viewers simultaneously—e.g., via dedicated cable or satellite infrastructure. While network hubs can be employed in a LAN to broadcast information to all network nodes, broadcasting packets of video segments across switches and routers over the Internet would be wildly impractical and inefficient. Most network users would not be interested in viewing any given "channel" of video content, and significant congestion would occur near the point of origin as routers broadcasting video segments to other routers would be quickly overwhelmed. A broadcast solution is simply not feasible for delivering a channel of video content over the Internet from a single point of origin to a large number of concurrent viewers who can join the channel at any time.

An alternative "multicast" approach involves simultaneously streaming each video segment from a point of origin to predefined groups of nodes across the Internet. This approach is similarly impractical for large-scale video distribution across the Internet. Moreover, specialized infrastructure is required, such as dedicated routers with multicasting functionality, which is also impractical and prohibitively expensive for large-scale commercial use.

By contrast to broadcast and multicast techniques, a "unicast" approach to video streaming involves sending video segments from a point of origin to a single destination node (e.g., by establishing a TCP/IP connection with a defined destination node IP address). But delivering a large number of unicast packets simultaneously to each viewing node would also quickly overwhelm routers at or near the point of origin, and would fail to achieve a consistent QoS for many of the reasons noted above, not to mention the enormous cost of providing sufficient bandwidth to handle such a large number of simultaneous transmissions.

Some VOD companies (such as Netflix and YouTube) have employed variations of this unicast approach that generally rely on expensive "edge-server" infrastructure. This approach (sometimes referred to as a "content delivery network" or CDN) involves deploying many physical servers across the Internet, and distributing copies of each channel of video content to each server. As a result, viewing nodes can receive desired video content from a nearby server (in network proximity—only a relatively few hops away from a viewing node).

Each edge server typically has significant bandwidth and computational capabilities, and essentially constitutes a separate video content source from which nearby viewing nodes can obtain any channel of video content at any point in time ("on demand"). This approach of adding physical infrastructure is somewhat akin to building additional freeways and off-ramps to enable a greater number of people to reach popular destinations more quickly (with fewer turns and less time spent on slower roads).

While different users typically want to watch different video channels at any given time, VOD systems occasionally face "peak" demand periods during which a particular video event must be streamed to a large number of concurrent viewers (e.g., a final episode of a popular television series), which can overwhelm even the largest streaming video company's infrastructure—or at least result in an inefficient "worst-case" deployment of expensive infrastructure that is frequently underused (i.e., during more common periods of non-peak demand). Alternative VOD solutions have attempted to avoid the need for expensive edge-server infrastructure by replicating and distributing video content among network nodes themselves (as discussed, for example, in U.S. Pat. Pub. No. 2008/0059631).

With or without expensive edge-server infrastructure, none of these VOD solutions addresses the QoS problem for unscheduled video events, as they all rely on "pre-seeding" edge servers or viewing nodes throughout the Internet with content known in advance—to ensure a nearby source of video content. Streaming a live unscheduled event would require real-time concurrent delivery of video content to all of these edge servers or viewing nodes, a problem not addressed by any of these VOD systems.

More recently, certain unicast-based video streaming standards (e.g., "WebRTC") have evolved to facilitate "point-to-point" streaming of video among desktop and mobile web browsers without the need for any plugins. Many existing smartphones, as well as desktop and laptop computers, include WebRTC libraries that support browser-to-browser video streaming, as well as "adaptive streaming" libraries that enable a viewing node to detect its bandwidth and CPU capacity in real time, and automatically request a lower or higher "bit rate" to adapt to changes in those metrics.

Adaptive streaming implementations include Apple's "HTTP Live Streaming" (HLS), Microsoft's "Smooth Streaming" and the "MPEG-Dash" ISO standard, among others. In a typical point-to-point video streaming scenario, a receiving node periodically requests from an HTTP server "manifest files," which include the locations of each available bit-rate version of upcoming (e.g., the next eight) video segments. For example, each video segment might be available in 1080p, 720p and 480p versions, reflecting different "video resolutions" that require different streaming bit rates (bandwidth) to ensure each video segment is delivered in essentially the same amount of time, regardless of its resolution.

Standard HTML5 video players (in web browsers that support WebRTC) typically buffer three video segments before they start playing video content. They use the current manifest file to send an HTTP request to an HTTP server for each video segment. The sending node then "pushes" each video segment (in small "chunks") to the receiving node in accordance with WebRTC standards for playback in the receiving node's web browser. If the receiving node supports adaptive streaming implementations, and determines that the time required to receive recent video segments is increasing or decreasing significantly, it automatically begins requesting lower or higher bit-rate video segments from among the choices in the manifest file. In other words, it "adapts" to its actual bandwidth over time by varying the resolution of the video segments it requests.

The "resolution" of a frame of video is a measure of its width×height (e.g., 1920×1080 or 1080p) or number of pixels in a frame, while its "bit rate" refers to the number of "bits per second" (bps) that are transmitted from a sender to a receiver. For example, if 30 frames of 1080p-resolution video are delivered every second (30 "frames per second" or fps), and each color pixel contains 24 bits (24 "bits per pixel" or 24 bpp), then the bit rate would be equal to almost 1.5 Tbps (1,492,992,000 bps—i.e., 1,492,992,000=(1920× 1080 "pixels per frame" or ppf)×(24 bpp)×(30 fps).

Standard video codecs employ compression (e.g., MPEG2 compression) and other video encoding techniques to yield lower effective bit rates (e.g., 3 Mbps). In view of the above, "bit rate" and "resolution" are highly correlated in that one can increase or decrease the effective bit rate by providing higher or lower resolution frames of video. We therefore use these terms somewhat interchangeably herein in this regard.

WebRTC and adaptive streaming standards permit virtually any smartphone user to capture and stream live video events, and also enable such users to join a streaming video channel originating from another point of origin across the Internet—ranging from other individual smartphone users to large companies hosting an array of video content. These standards are designed, however, for point-to-point video streaming, and do not address the "video delivery" problem of streaming a video channel to large numbers of concurrent viewers across the Internet.

To address this problem, some video streaming companies (e.g., StreamRoot) have adopted an approach that typically involves a "peer-to-peer" (P2P) or mesh network topology in which video content is relayed from one viewing node to another (sometimes referred to as "peercasting"). In a video streaming context, these terms can be used interchangeably to refer to overlay networks configured on top of the Internet that enable viewing nodes to relay streaming video content to one another in a distributed fashion. Delivering streaming video to large numbers of concurrent viewers should be distinguished, however, from non-streaming uses of a P2P or mesh network topology, e.g., for file transfer or file sharing applications.

P2P video streaming systems deliver a channel of video content from a single point of origin to large numbers of concurrent users over the Internet. Such systems tend to be both resilient and scalable, in that their distributed nature facilitates recovery from individual points of failure (e.g., by rerouting content via other nodes), and their reliability and performance actually improve as more nodes are added to the network (i.e., as more and better routing "relay" options become available).

When new nodes join a video channel or existing nodes leave (stop viewing) the channel, P2P video streaming systems must, to some extent, dynamically reconfigure the topology of the overlay network—i.e., modify at least some of the routing paths among network nodes to accommodate the new nodes. For example, when a new node is added, its geographic location may be considered in an effort to select nearby existing nodes from which it will receive (and to which it will relay) video content.

But, if "peer" nodes are selected based merely on their geographic proximity, they still may be relatively "distant" from one another (and not in network proximity)—e.g., if they reside in different ASNs. As a result, traffic among them may cross one or more potentially congested peering points. For example, the actual latency between two nodes in close geographic proximity may exceed the sum of the latencies between each of those nodes and a geographically distant node. This phenomenon is sometimes referred to as a "triangle inequality violation" (TIV), which illustrates the disadvantages of relying on BGP routing for delivering digital content among nodes of an overlay network across ASN peering points.

One reason for this problem with existing P2P video streaming systems is that they are not constructed to be "compatible" with the underlying architecture of the Internet. Any overlay network topology built on top of the Internet is still subject to many points of disruption or failure (apart from new or disappearing nodes), such as the myriad of QoS problems noted above. By not addressing the Internet's underlying QoS volatility, particularly at ASN peering points, such systems face significant obstacles in providing their users with a consistent QoE.

Thus, existing P2P video streaming systems (like GPS navigation systems) rely on geographic proximity (rather than network proximity) to select peer relay nodes, and reroute traffic only "after the fact" once congestion is encountered. Moreover, real-time streaming of linear data to concurrent users imposes an additional constraint not found in GPS navigation systems—the content must arrive "simultaneously" at each node. Edge-server and other physical infrastructure approaches (akin to building freeways and off-ramps to provide higher-speed routes) are expensive and also fail to adequately address the problems of unscheduled events and high-concurrent usage of any particular event.

There is therefore a need for a digital content delivery system that addresses the deficiencies discussed above, and takes into account the underlying architecture of the Internet (particularly at ASN peering points through which so much Internet traffic flows) in generating and dynamically reconfiguring overlay networks so as to provide client nodes with a consistent QoE.

SUMMARY

In accordance with the present invention, various embodiments of novel methods and architectures are disclosed with respect to a digital content delivery system that provides users of nodes on an underlying network (e.g., the Internet) with a consistent QoE by: (1) maintaining a map of shared links interconnecting components of the underlying network (e.g., ASNs and the peering points interconnecting them), including a location of each node within one of the components (e.g., within an ASN); (2) generating metrics by monitoring network traffic among the nodes that crosses those shared links (ASN peering points) along one or more overlay networks built on top of the underlying network (Internet); (3) analyzing the metrics and the map over time to forecast congestion levels reflecting the changing capacity of the shared links (ASN peering points) over time; and (4) dynamically reconfiguring the topology of the overlay networks, based on the forecasted congestion levels, to generate optimal routes of the digital content among the client nodes along the overlay networks.

Particular embodiments of the "virtual broadcast" system of the present invention are described herein in the context of providing a consistent QoE among viewers of one or more channels of video content, each of which is streamed in real time from a single point of origin to potentially large numbers of concurrent viewers that may join the channel at different times (while avoiding the need for edge servers or other expensive physical infrastructure). As will be explained in greater detail below, we use the term "virtual broadcast" in the context of unicast streaming of linear content to concurrent users. From the perspective of the users, the content is "broadcast" to them, in that they receive the content "simultaneously," even though unicast streaming is employed to route the content. Other embodiments of the present invention will be apparent to those skilled in the art in numerous other contexts where limited capacity of shared links among network components constrains the routing of any type of information that can be converted into a digital format.

For the purposes of this specification, a single node that receives multiple different channels concurrently can be considered a distinct node on separate overlay networks, each defined by a single channel. In a VOD context, each separate "showing" of a particular program can be considered a separate channel having its own network of viewing nodes.

The system of the present invention is capable of handling unscheduled as well as scheduled events, streaming live as well as pre-recorded events, and streaming those events in real time with minimal delay in a highly scalable fashion that maintains a consistent QoE among large numbers of concurrent users—despite being implemented on overlay networks built on top of the Internet that are subject to the Internet's QoS volatility. Performance of the system and the QoE of the users actually improve as the number of concurrent users (particularly within any given ASN) increases.

A client-server architecture is employed to centralize server-side routing decisions. Distributed streaming delivery of video content is effected via dynamically reconfigurable P2P overlay networks that enable video content to be relayed among (i.e., "pushed" to) the viewing nodes of each video channel. Client nodes may employ standard HTML5 video players (built into most desktop and mobile web browsers) to view or play the video, and rely on custom embedded code (such as Javascript) to implement additional functionality, such as managing the receipt of video segments and the relaying of those video segments to other nodes, as well as monitoring various performance metrics. In other embodiments, some or all of such functionality may be integrated into a custom application or mobile app.

The system of the present invention facilitates "point-to-point" video streaming among desktop and mobile web browsers, and adapts to changes in node bandwidth by automatically requesting lower or higher bit-rate video segments. In one embodiment, the virtual broadcast system employs unicast standards, including WebRTC and adaptive streaming standards (such as HLS, MPEG-Dash, or Smooth Streaming) to facilitate video streaming without the need for web browser plugins, and to enable nodes to detect their performance capabilities, such as bandwidth and CPU capacity.

Each event is provided to a central "Virtual Broadcast Server" for "point-of-origin" delivery of each channel to concurrent users over multiple dynamically reconfigurable overlay networks. Events can be obtained from virtually any source (including a CDN), whether transferred as complete files or streamed live to the Virtual Broadcast Server. In embodiments utilizing WebRTC, any user with a smartphone that implements WebRTC can upload pre-recorded video events, or capture events live and upload them to the Virtual Broadcast Server (as well as view other channels streamed from the Virtual Broadcast Server) for subsequent delivery to users via the overlay networks.

The Virtual Broadcast Server includes, in one embodiment, a "POI Content Server" which serves as the point of origin for each channel from which video segments are delivered via the dynamically reconfigurable overlay networks built on top of the Internet. Video segments are typically fixed in size (e.g., from 1 to 10 seconds), as determined by the originating publisher of the video event. The video segments are viewed by client nodes and "pushed" (i.e., relayed as individual fixed-size "chunks" in accordance with the WebRTC standard) from node to node along the routes defined by the overlay networks. In one embodiment, each video segment is divided into 64 KB chunks to match the size of a UDP datagram "packet" for maximum efficiency when streamed via the MPEG2 transport protocol.

While video segments are effectively pushed to each client node in most cases, a client node may, in one embodiment, detect that all of the chunks of a video segment have not arrived in time, and may utilize the current manifest file to request the video segment from the POI Content Server (i.e., as a "fallback" feeding location).

As each node seeks to join a channel made available by the POI Content Server, the node determines (with assistance from the Virtual Broadcast Server in another embodiment) the particular ASN in which that node resides. The Virtual Broadcast Server utilizes this "ASN location" information, along with a dynamic "ASN Interconnection Map" of the Internet (including ASNs and their various peering point interconnections) and various monitored performance metrics, to optimize the routing of the channel content among overlay networks that are dynamically reconfigured based on forecasts of the congestion levels at these ASN peering points. In another embodiment, the Virtual Broadcast Server also utilizes each node's geographic location, in addition to its ASN location, to assist in this process.

In one embodiment, the topologies of the overlay networks define the routing paths of video segments among the viewing nodes, and are dynamically reconfigured (in whole or in part) for each video segment of a channel. In another embodiment, they are dynamically reconfigured (in whole or in part) for each chunk of a video segment. In this manner, the architecture of the Internet (as well as predicted congestion levels at ASN peering points) is taken into consideration in determining optimal routing paths for each video segment of a video channel. In another embodiment, if some or all of the routes along the overlay networks are capable of delivering video segments in time (even if such routes are non-optimal), then such routes are not reconfigured until a predefined congestion threshold is met, or another sufficiently significant problem is identified.

In one embodiment, client nodes monitor performance issues relating, for example, to last-mile problems and QoS problems across the Internet (including congestion at ASN peering points), as well as congestion resulting from the number of concurrent viewers of one or more channels of the virtual broadcast system itself. They monitor the time required to contact designated sites across the Internet, and across ASNs, as well as the time required to relay video segments to other nodes. Client-monitored metrics are communicated to the Virtual Broadcast Server for use in making dynamic routing decisions. In one embodiment, the Virtual Broadcast Server includes a "Signaling Server" to communicate with client nodes via standard WebSocket protocols.

Client nodes optionally include an "Uploader" that enables users to capture a video event and upload it to the Virtual Broadcast Server in real time. Because the path from any client node to the Virtual Broadcast Server may cross multiple ASNs, a custom "showering" protocol is employed to facilitate the streaming of the video event, and avoid packets being delayed or blocked at intermediate routers. In one embodiment, client nodes can also search for and view "trending" events (referred to herein as "splashes") via a "Splash Extractor" search engine on the Virtual Broadcast Server that identifies splashes and, based on user searches, provides users with the ability to stream and view trending events from across the Internet that are not otherwise made available via the POI Content Server.

Upon requesting to join a channel, nodes are classified by the Virtual Broadcast Server based upon their relay capabilities—i.e., their reliable "upstream" bandwidth, which is inferred from various factors, including their connection type (e.g., 3G or 4G cellular, WiFi, LAN, etc.) as well as their CPU, operating system, browser and memory configurations, and other fixed and variable performance metrics monitored over time. In one embodiment, nodes are classified into three levels based on their relative relay capability. The lowest-level nodes ("C" nodes) can view video segments, but cannot relay them to other nodes. The middle-level nodes ("B" nodes) can both view and relay video segments within an ASN. The highest-level nodes ("A" nodes) can view and relay video segments to other A nodes both within and across ASNs.

In another embodiment, node classifications can be dynamically altered, for example, based on monitored performance metrics and the present needs of the system for more or fewer relay nodes of a given classification. In addition, if sufficient A nodes exist within an ASN to relay video segments, an A node may be designated as a "B:A" node, indicating that it will be treated as a B node, but may be elevated to an A node if needed (e.g., if existing A nodes leave the channel). In one embodiment, if an individual node exhibits a significant change in performance (for better or worse), the node may be reclassified (e.g., from a B node to a C node, or vice-versa), and, if and when the problem resolves itself, be restored to its initial classification.

In another embodiment, client nodes are allocated multiple "slots" (based, for example, on their capabilities and client performance metrics) to enable them to relay and receive the chunks of a video segment to and from multiple other nodes. In this embodiment, client nodes receive a video segment from only one "feeding" node, but may "feed" or relay that video segment to multiple other client nodes. A nodes are allocated up to eight relay slots, four for relaying to A nodes within the same ASN and four for relaying to A nodes in other ASNs—i.e., across an ASN peering point. B:A and B nodes are allocated up to eight slots for relaying to other client nodes (i.e., other B:A, B and C nodes) within their ASN. In another embodiment, a client node may be "fed" by multiple other client nodes (e.g., by alternating chunks among multiple incoming slots). This technique may be employed for high bit-rate (e.g., 4K) video streams in which higher performance is required.

In another embodiment, certain nodes (based, for example, on their capabilities and client performance metrics) may receive multiple resolutions of a video segment from a single feeder node (or, in an alternate embodiment, receive different resolutions from different feeder nodes). If the upstream bandwidth of these nodes is sufficient, they may be deemed "polycasting" nodes and, to the extent needed, may also relay or feed those multiple resolutions of a video segment to one or more designated nodes.

To facilitate the dynamic reconfiguration of the overlay networks, the Virtual Broadcast Server employs a "Deep Mapper" deep learning engine that continuously analyzes performance metrics to predict the level of congestion across ASN peering points—i.e., to predict the congestion level of an ASN peering point a short time (e.g., one minute) into the future. In one embodiment, a predicted "congestion value" is generated for each potential inter-ASN path between A nodes—e.g., from one A node in an ASN to an A node in another ASN. In another embodiment, the congestion value reflects the predicted level of congestion for the optimal path between each pair of A nodes.

In one embodiment, the Virtual Broadcast Server employs an "Overlay Network Creator" to generate and dynamically reconfigure (in whole or in part) both inter-ASN and intra-ASN overlay networks—e.g., determining an optimal path for video segments to be pushed from one node to another both within and across ASNs. In this embodiment, the Overlay Network Creator considers the number of available slots that each node can utilize, as well as the number of resolutions each node can receive or relay.

The Overlay Network Creator generates and dynamically reconfigures (with the assistance of the Deep Mapper) an inter-ASN "Virtual Data Trunk" overlay network, which represents the topology of the A nodes. In other words, it represents the A nodes and the links or routing paths that a video segment will follow among those A nodes within and (in particular) across ASNs—i.e., through potentially congested ASN peering points.

The Virtual Data Trunk identifies the set of A nodes which will be instructed to request each video segment from the nearby POI Content Server (e.g., using the current manifest file), as well as the set of A nodes to which each of them will push that video segment, and so on (both within and across ASNs). As a result, that video segment will be spread across every ASN containing a viewing node. To reach each viewing node, the segment may also travel across interim private backbone ASNs with no viewing nodes.

Overlay Network Creator also generates one or more intra-ASN "Swarm" overlay networks to relay a video segment from A nodes within an ASN to the B:A, B and C nodes within that ASN. These Swarm overlay networks may be dynamically reconfigured (in whole or in part) for each video segment (or for each chunk of a video segment in an alternate embodiment). In one embodiment, each Swarm overlay network within an ASN represents a hierarchical topology (with respect to an A node within the ASN) of the B:A, B and C nodes that receive, view and relay (with the exception of C nodes) the video segment among the nodes in that Swarm hierarchy.

Thus, the virtual broadcast system and methods of the present invention make efficient use of limited capacity at ASN peering points and other key points of congestion by monitoring and analyzing network traffic to optimize the routing of digital content among nodes of Virtual Data Trunk and Swarm overlay networks that are dynamically reconfigured based on forecasts of congestion levels at these key congestion points, thereby maintaining a consistent QoE among system users.

DETAILED DESCRIPTION

Detailed embodiments of the systems and methods of the present invention are illustrated in the accompanying Figures and described below. It should be noted at the outset that the present invention is not limited to the particular embodiments discussed below with reference to the Figures.

As noted above, while a specific application of the present invention is described herein in the context of delivering streaming video over the Internet to large numbers of concurrent users, the principles of the present invention apply equally in numerous other contexts where limited capacity of shared links among network components constrains the routing of any type of digital content.

Even within the context of delivering streaming video over the Internet, the allocation of functionality between client nodes and server components described herein is the result of design tradeoffs, and much of this functionality could be reallocated between client-side and server-side components without departing from the spirit of the present invention. Similarly, the client-side functionality could be allocated into a single modular component or spread across multiple different components, and could be implemented as one or more standalone applications or mobile apps, or as a combination of standalone applications or apps and Javascript or other scripting or programming languages. Moreover, server-side components could be implemented on a single hardware server, or across multiple different servers. Such functionality could also be integrated into a single software module or allocated among different software modules spread across one or more hardware servers.

Finally, in those embodiments in which standard protocols and libraries are utilized (e.g., HTTP, WebSocket, WebRTC, STUN and various adaptive streaming standards), the functionality provided by some or all of such standard protocols and libraries could be replaced with other standard or proprietary implementations, without departing from the spirit of the present invention.

Overlay Networks

Figure 1:
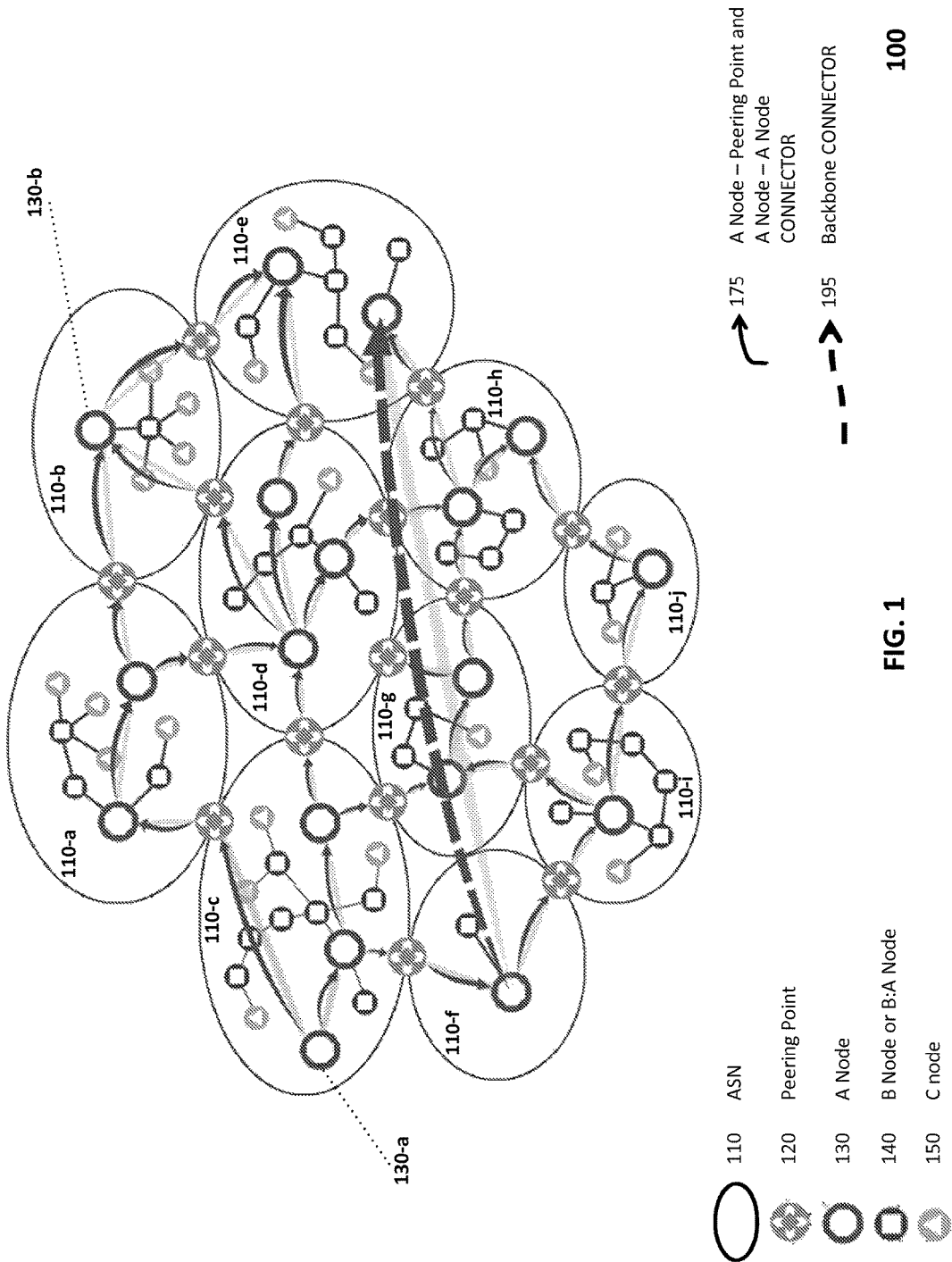
FIG. 1 is a graph illustrating one embodiment of overlay networks of the present invention dynamically configured on top of the Internet.

FIG. 1 is a graph illustrating one embodiment of Overlay Networks 100 of the present invention mapped on top of the Internet. Although the Internet can itself be illustrated in a myriad of different ways, FIG. 1 illustrates the Internet as a set of ASN 110 fiber rings, interconnected via Peering Points 120. The individual client nodes viewing a particular video channel at any point in time are illustrated inside each ASN 110. Though not shown in FIG. 1, multiple channels, and thus multiple sets of Overlay Networks 100, could (in one embodiment) be active concurrently.

As noted above, a Virtual Data Trunk overlay network represents the interconnections 175 among the A nodes 130, both within an ASN 110 (directly connected) and across ASNs 110 (i.e., via Peering Points 120). Backbone connector 195 illustrates the interconnection of A nodes between two ASNs 110, via a private ASN (not shown) that does not include any commercial nodes, but merely interconnects two public ASNs 110. For example, backbone connector 195 is shown connecting an A node 130 in ASN 110-*f* with an A node 130 in ASN 110-*e*. In this scenario, traffic between those two A nodes 130 may travel through multiple "private" Peering Points 120 (or other proprietary connections with private ASNs).

As alluded to above, in one embodiment, the performance of such connections can be monitored only at the endpoints (i.e., the two A nodes 130), as is the case with connections 175 between A nodes 130 in two different public ASNs 110 (i.e., via a Peering Point 120). Traffic along a connection 175 between two A nodes 130 in the same ASN 110 will likely be relatively faster than traffic across ASNs 110, as it does not traverse a potentially congested Peering Point 120. Though background connector 195 and connections 175 to/from A nodes 130 are illustrated with one-way arrows, these reflect only current one-way routing paths, despite the fact that two-way connectivity is supported among all client nodes illustrated in FIG. 1.

It should be noted that all traffic between any two client nodes of the present invention traverses the public Internet, and thus passes through various intermediate routers (not shown) which affect QoS. The system monitors QoS effects both within an ASN 110 and across ASNs 110 (and thus one or more Peering Points 120). In one embodiment, such intra-ASN and inter-ASN traffic is monitored by each client node (at the direction of the Virtual Broadcast Server), and delivered to the Virtual Broadcast Server for dynamic reconfiguration of the nodes and routing paths represented by Overlay Networks 100 (including the Virtual Data Trunk overlay network among A nodes 130 and the Swarm overlay networks from each A node 130 within an ASN 110 to the B (and B:A) nodes 140 and C nodes 150 within that ASN 110).

FIG. 1 illustrates the various routing paths that a video segment follows among client nodes given a "current state" of these Overlay Networks 100. In other words, it illustrates a current topology of these Overlay Networks 100 which, in one embodiment, can be dynamically reconfigured for each video segment (and, in an alternate embodiment, for each chunk of a video segment). It should be noted that, for any particular video segment, Overlay Networks 100 may or may not be reconfigured (in whole or in part), as this decision will depend at least in part upon the performance metrics gathered over time.

ASN 110-*c* illustrates a scenario in which the POI Content Server (not shown) resides in ASN 110-*c* or nearby (e.g., across one or two other ASNs 110), and responds to an HTTP request to deliver the current video segment to A node 130-*a* to initiate the streaming of video segments on a channel along the Overlay Networks 100. As will be discussed in greater detail below, the POI Content Server typically will deliver each video segment to multiple requesting A nodes 130 in the same or nearby ASN 110, and these A nodes 130 will in turn push the video segment to multiple other nodes along the Overlay Networks 100, resulting in a "redistribution" of multiple concurrent copies of chunks of video segments being delivered to and relayed from client nodes at any given point in time.

In this scenario, A node 130-*a* relays the video segment to two other A nodes 130—one within ASN 110-*c* and another across a Peering Point 120 to ASN 110-*a*. As noted above, the Virtual Data Trunk overlay network represents the routing paths that a video segment will follow as it is relayed among A nodes 130 within and across ASNs 110. Thus, in this scenario, the video segment is relayed not only among multiple A nodes 130 within ASN 110-*c*, but also from ASN 110-*a* across various Peering Points 120 to multiple directly interconnected ASNs (i.e., 110-*a*, 110-*d*, 110-*f* and 110-*g*), from which it is further relayed across multiple hops of the Virtual Data Trunk overlay network to other ASNs 110.

As will be explained in greater detail below, the number of A nodes 130 required within an ASN 110 will depend upon various factors, such as the number of other client viewing nodes within that ASN 110, as well as their relative capabilities (as determined by their classification, number of open slots and performance metrics monitored over time). For example, ASNs 110-*b*, 110-*f*, 110-*i* and 110-*j* are each illustrated with only a single A node 130, even though they have differing numbers of other client nodes to feed (compare the single other node in ASN 110-*f* to the many other nodes in ASN 110-*i*).

While the monitored upstream bandwidth of a node is a key factor in determining how many nodes it will feed directly (i.e., how many outgoing slots will be used), it is important to recognize that the length of the "chain" of nodes within an ASN 110 (relaying a video segment from one to the next, and so forth) is largely irrelevant given how quickly these relays are effected (typically well under 1 ms). For example, the single A node in ASN 110-*i*, which directly feeds two A nodes in external ASNs 110 (ASN 110-*g* and ASN 110-*j*) as well as two B nodes 130 within ASN 110-*l*, uses 4 outgoing slots (reflecting relatively high monitored upstream bandwidth in this embodiment). Yet, the long chain of B nodes 140 and C nodes 150 which are indirectly fed from the single A node in ASN 110-*i* is not a reflection of its upstream bandwidth.

Within each ASN 110, one or more Swarm overlay networks are generated (dynamically reconfigured for each video segment in this embodiment) to relay the video segment within that ASN 110 from each A node (i.e., the "root" node of a Swarm overlay network) to the various B (and B:A) nodes 140 and C nodes 150 within that Swarm overlay network. Although only one Swarm overlay network is illustrated in ASN 110-*c* (as compared to two Swarm overlay networks illustrated in ASN 110-*h*), the number of Swarm overlay networks generated within each ASN 110 (and internal topology of each Swarm overlay network) will depend on various factors, such as the number of client viewing nodes within that ASN 110, as well as current and historical performance metrics, number of open slots, etc.

As noted above, a client node, such as A node 130-*b* in ASN 110-*b*, can receive a video segment from multiple other client nodes (in this case from two other A nodes 130 in different ASNs (110-*a* and 110-*d*). In one embodiment, these two other feeding nodes alternate sending chunks of the video segment to A node 130-*b* for performance reasons—e.g., because these chunks cross Peering Points 120, whose levels of congestion are continuously monitored, as will be explained in greater detail. In other embodiments, this may be done for purposes of redundancy—e.g., because the reliability of the feeding nodes may be questionable based upon historical performance metrics (apart from or in addition to congestion of Peering Points 120.

The methods by which performance metrics are monitored, video segments are relayed and Overlay Networks 100 are dynamically reconfigured, are explored in greater detail below with respect to FIG. 4, following a discussion of key client-side (FIG. 2) and server-side (FIG. 3) functional components that implement these methods.

Client Streaming Video Device

Figure 2:
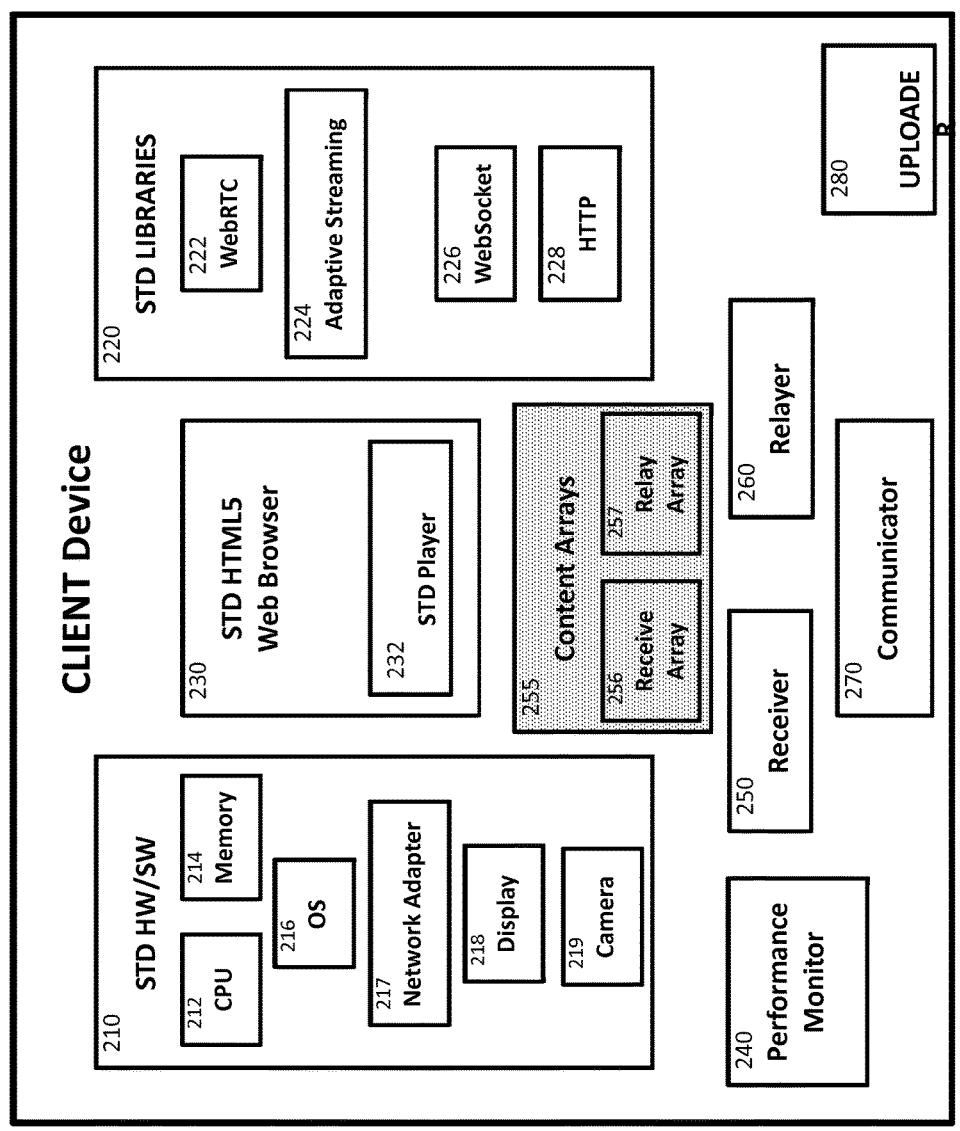
FIG. 2 is a block diagram illustrating one embodiment of key client-side components of a client streaming video device of the present invention.

Turning to FIG. 2, Client Device 200 illustrates one embodiment of key components of a client streaming device of the present invention. Client Device 200 can be implemented as a desktop or laptop computer, as well as a smartphone or other mobile device, or virtually any other consumer electronic device capable of handling streaming content, such as streaming video. Client Device 200 includes certain standard hardware and software computing components and related peripherals 210, including a CPU 212, Memory 214, Operating System 216, Network Adapter 217, Display 218 and Camera 219, which are well known in the art. Client Device 200 utilizes these components and peripherals 210, along with certain Standard Libraries 220, to become a network node, and to receive, display and relay streaming video content among other network nodes of the virtual broadcast system of the present invention.

The present invention leverages certain Standard Libraries 220 (also found on most smartphones, as well as many other computing devices) that implement network protocols and other functionality which can be employed to facilitate streaming video content between devices. For example, video content can be streamed between two smartphone users and displayed on their mobile web browsers without requiring any plugins. Standard Libraries 220 include WebRTC 222 APIs (which facilitate browser-to-browser communication for streaming video content), various Adaptive Streaming 224 implementations, such as HLS, MPEG-Dash, and Smooth Streaming, among others (which enable automatic adjustment of streaming bit rates to "adapt" to real-time detection of changes in client bandwidth and CPU capacity), the WebSocket 226 protocol (which facilitates rapid two-way client-server communications over a single TCP/IP connection) and HTTP 228 (for less-frequent standard communications between web servers and client web browsers).

Client Device 200 also includes a Standard Player 232 (in one embodiment, a standard video player integrated into a Standard HTML5 Web Browser 230) to view or play streaming digital content. In other embodiments, Standard Player 232 is integrated into a standalone desktop application or smartphone app. One advantage of leveraging Standard HTML5 Web Browser 230 is that many of the Standard Libraries 220 are designed to work with web browsers, and thus do not require any plugins or other custom functionality that would necessitate a standalone desktop application or smartphone app.

Moreover, web browsers also support client-side scripting languages, such as Javascript, which is frequently used to supplement standard web browser functionality (delivered, for example, from a standard web server as part of a webpage, without requiring any client browser plugins). In one embodiment, the non-standard key components of Client Device 200 (including Communicator 270, Performance Monitor 240, Receiver 250, Relayer 260, and Uploader 280) are implemented in Javascript, and Content Arrays 255 are generated and maintained by that Javascript code. It should be noted, however, that some or all of these components can be implemented in other programming languages, and in standalone desktop applications or smartphone apps, without departing from the spirit of the present invention.

The Standard Libraries 220 facilitate generic point-to-point (unicast) streaming of content, including video content. The non-standard key components of Client Device 200 address the client-side aspects of the digital content delivery architecture implemented by the virtual broadcast system of the present invention. In one embodiment, a streaming protocol is built on top of WebRTC 222 in which routing of content is centralized via a client-server architecture, and the content itself is streamed in a distributed fashion (pushed from node to node) via dynamically reconfigurable P2P overlay networks.

A user of Client Device 200 may first encounter one or more channels of content in various different ways—e.g., via links in an email or on a webpage, or even from within a standalone desktop application or smartphone app. In one embodiment, Virtual Broadcast Server 300 (discussed in greater detail below with respect to FIG. 3) delivers a standard HTML5 webpage with a selection of channels to HTML5 Web Browser 230. This "channel webpage" includes proprietary Javascript code that is interpreted by HTML5 Web Browser 230 to implement the functionality of the non-standard components of Client Device 200, which includes communicating with Signaling Server 330 as well as with other client nodes (e.g., using WebRTC 222 and Adaptive Streaming 224 libraries), as well as receiving, processing and relaying chunks of video segments from and to such nodes.

Upon clicking on a channel link in the channel webpage, the user generates a request to join a particular channel of video content that is currently being streamed, or, in another embodiment, will begin streaming at a later predefined point in time (a "join request"). Signaling Server 330 of Virtual Broadcast Server 300 responds to the join request by attempting to establish a WebSocket 226 connection with Client Device 200 via Communicator 270. As will be discussed in greater detail below with respect to FIG. 3, Virtual Broadcast Server 300 employs the "STUN" 322 protocol to discover the public IP address of Client Device 200 (e.g., behind a NAT firewall) so that Client Device 200 can establish a WebSocket 226 connection with Virtual Broadcast Server 300, and WebRTC 222 connections with other Client Devices 200 for receiving and relaying video content.

In the embodiments discussed herein, Client Device 200 joins only one video channel at any given time. In other embodiments, Client Device 200 may join multiple channels concurrently without departing from the spirit of the present invention.

Client Device 200 utilizes Communicator 270 for bidirectional communications with Signaling Server 330 to facilitate rapid exchanges of messages while keeping a single TCP/IP connection open. As will be discussed in greater detail below, such communications are employed for various purposes, including (i) providing Virtual Broadcast Server 300 with initial information regarding Client Device 200 capabilities (e.g., OS, web browser and connection type—3G, 4G, WiFi, LAN, etc.), (ii) enabling Virtual Broadcast Server 300 to verify client node connectivity for subsequent WebRTC 222 inter-node streaming of video segments via Overlay Networks 100, and (iii) exchanging real-time dynamic monitoring information (obtained via Performance Monitor 240, as discussed below) with Virtual Broadcast Server 300.

In one embodiment, this Javascript code contained in the channel webpage also analyzes the capabilities of Client Device 200 to determine whether it is a C node (that receives video segments, but does not relay them to other client nodes), and provides this information to Signaling Server 330. In other embodiments, certain capabilities of the Client Device 200 are sent to the Virtual Broadcast Server 300, which determines whether the Client Device 200 is a C node.

This Javascript code also facilitates communications with POI Content Server 380 to manage the receipt of video segments by Receiver 250 for playback by Standard Player 232. This process is, in effect, an extension of the standard point to point video streaming scenario, which leverages standard WebRTC 222 and Adaptive Streaming 224 functionality.

In one embodiment, Standard Web Browser 230 interprets the proprietary Javascript code from the channel webpage to request manifest files periodically as described above. Such standard HTTP requests are directed to POI Content Server 380, which provides the manifest files. Standard Web Browser 230 also leverages the standard Adaptive Streaming 224 libraries to request the video segments themselves from the locations specified in the manifest file, including higher or lower bit rate versions of these video segments as discussed above (e.g., when a change in bandwidth is detected).

These requests for video segments are intercepted by the proprietary Javascript code from the channel webpage—i.e., because each video segment is pushed to Client Device 200 from another (feeder) node of Overlay Networks 100 (obviating the need for Client Device 200 to initiate an HTTP "pull" request). In one embodiment (discussed in greater detail below), Virtual Broadcast Server 300 adds Client Device 200 to Overlay Networks 100 (and thus to the channel) shortly after the join request is received, so that one or more initial video segments will be pushed to Client Device 200 to enable it to begin playing the video content as soon as possible.

As Receiver 250 receives chunks of each video segment, it generates Content Arrays 255 to facilitate the receipt and playback of the video segments, as well as the relaying of the video segments (if Client Device 200 is not designated a C node) to other client nodes. Receiver 250 generates a Receive Array 256 to compile the chunks into a complete video segment, which is provided to the three-segment buffer maintained by Standard Player 232. If, upon intercepting the HTTP request for a video segment, Receiver 250 determines that the complete video segment is not yet in Receive Array 256, then the video segment will be requested from an alternate (or "fallback") location specified in the manifest file (i.e., POI Content Server 380). From the perspective of Standard Player 232, it receives video segments in response to standard HTTP requests, and is unaware that the video segments are actually being pushed to Client Device 200 via Overlay Networks 100.

Moreover, in one embodiment, Receiver 250 also leverages Adaptive Streaming 224 libraries to communicate to Signaling Server 330 (via Communicator 270) the bit rate that Client Device 200 can handle (regardless of whether Standard Player 232 makes such a request in the normal manner via the manifest file). For example, if Client Device 200 experiences a temporary significant drop in its bandwidth (resulting in a video segment not arriving in Receive Array 256 before it is needed), it might request one (fallback) video segment from POI Content Server 380, and then be pushed subsequent lower-resolution video segments via Overlay Networks 100. Once its bit rate returns to normal, it might then be pushed higher-resolution video segments as it did before the problem occurred.

As noted above, in one embodiment, Virtual Broadcast Server 300 dynamically reconfigures Overlay Networks 100 for each video segment, including Virtual Data Trunk overlay networks (among A nodes within and across ASNs) and Swarm overlay networks (from each A node within an ASN to other nodes within that ASN). Unless Client Device 200 is classified as a C node (that receives video segments, but does not relay them to other client nodes), Relayer 260 will receive instructions from Virtual Broadcast Server 300 (with respect to each video segment of the video channel it joined)

regarding the node or nodes to which it will relay that video segment. As discussed above with reference to FIG. 1, whether Client Device 200 is an A, B:A or B node, it may be asked to relay the video segment to multiple other client nodes.

The length of video segments (e.g., from 1-10 seconds) is defined by the originator of the video content in accordance with Adaptive Streaming 224 standards. Relayer 260 will relay the video segment to each designated destination client node by pushing chunks in accordance with the "RTCDataChannel" component of the WebRTC 222 standard (which does not mandate a signaling protocol).

In one embodiment, each video segment is divided into 64 KB chunks to match the size of a UDP datagram ("packet") for maximum efficiency when streamed via the MPEG2 transport protocol. Client Device 200 sends and receives UDP "packets" one chunk at a time (falling back to TCP when necessary per the WebRTC 222 standard). A 1-second video segment, for example, would contain approximately 625 chunks (assuming a 1080p H.264 encoder, which yields about 5000 Kbps).

As Receiver 250 receives chunks of each video segment, it generates Receive Array 256 to compile those chunks and construct complete video segments. Relayer 260 generates Relay Array 257 to compile those chunks for the purpose of sending (relaying) them to designated destination client nodes. In this manner, Relay Array 257 acts as a buffer for incoming and outgoing chunks of a video segment. As will be discussed below, Performance Monitor 240 tracks the time required to stream the entire video segment to each designated destination client node, and reports that metric back to Virtual Broadcast Server 300 (for subsequent use in dynamically reconfiguring Overlay Networks 100).

In one embodiment, a receiving client node receives a video segment from a single feeding node, such as Client Device 200. In another embodiment, multiple potential feeding nodes are selected by Virtual Broadcast Server 300, and they communicate among themselves to negotiate the "top two" candidates (e.g., based upon current bandwidth or other monitored performance metrics), and then alternate sending chunks to the designated receiving client node.

In another embodiment, multiple different resolutions (e.g., 1080p, 720p and 480p) of each video segment are pushed among A nodes, and Virtual Broadcast Server 300 directs the A node at the root of each Swarm overlay network which of those resolutions to push to the other nodes within that Swarm overlay network (e.g., based upon the capabilities of those other nodes, as discussed in greater detail below).

During the time that Receiver 250 is receiving the chunks of a video segment for playback, and Relayer 260 is streaming those chunks to other designated client nodes, Performance Monitor 240 gathers various static and real-time dynamic performance metrics as directed by Virtual Broadcast Server 300, and continuously provides such metrics back to Virtual Broadcast Server 300 via Signaling Server 330.

As noted above, such metrics are used by Virtual Broadcast Server 300 to dynamically reconfigure Overlay Networks 100 to optimize routing of the next video segment. In particular, the performance metrics are used to classify and reclassify client nodes, allocate and de-allocate slots for relaying video segments to other client nodes, determine which resolutions of video segments can be received and relayed to other client nodes, and ultimately modify a subset of the routing paths among the client nodes when Overlay Networks 100 are dynamically reconfigured. The precise manner in which these performance metrics are utilized by Virtual Broadcast Server 300 will be discussed in greater detail below with respect to FIG. 3.

Static performance metrics, such as the type of operating system, browser and connection (e.g., 3G or 4G cellular, WiFi, LAN, etc.), are not likely to change frequently and are typically reported to Signaling Server 330 only upon the initial join request by Client Device 200 (though they will be reported in the event of a change—e.g., a change in cellular connection from 3G to 4G).

While dynamic information could be collected and reported on a continuous basis (i.e., as it is gathered), various tradeoffs are taken into account in one embodiment to ensure that the "overhead" (frequency of monitoring and reporting these dynamic metrics to Signaling Server 330) does not affect the "payload" or performance of the delivery of the video itself (i.e., the streaming of chunks to and from Client Device 200). In one embodiment, such metrics are used solely for the next video segment, while in other embodiments, changes can be effected for the next chunk (or multiple chunks) during the delivery of the current video segment.

In one embodiment, two types of dynamic performance monitoring are performed. The first involves "ping" times (or other similar measurements) to known sites on the Internet (e.g., to a Yahoo web server, Virtual Broadcast Server, etc.), both within and across the ASN in which Client Device 200 resides. Individually, such metrics provide insight into the performance of Client Device 200, while collectively they provide additional insight into QoS both within the ASN in which Client Device 200 resides, and across ASNs via particular Peering Points. While the Virtual Data Trunk overlay network (among A nodes) is of relatively greater concern (due to congestion at Peering Points), congestion within an ASN is also relevant (as it might, for example, require dynamic reconfiguration of at least part of one or more of the Swarm overlay networks within the ASN).

The other type of dynamic performance monitoring involves the total time required to relay a video segment from one client node to another. In one embodiment, each node (other than C nodes) records the "start" time when it sent the first chunk of a video segment to a designated destination client node, as well as the "stop" time after the last chunk of that video segment was received (e.g., because the WebRTC 222 standard provides verifications of each packet). Performance Monitor 240 sends this total time (for each video segment it sends) to Signaling Server 330. This metric also can provide insight not only regarding the individual performance of Client Device 200, but also the level of congestion both within its ASN, and across ASNs (e.g., if Client Device 200 is an A node feeding another A node across an ASN Peering Point).

In one embodiment, the user of Client Device 200 can also be the originator of video content. In most cases, this scenario results from the ever-increasing quality of smartphone cameras (such as Camera 219), which enable users to capture video events "anywhere at any time." But, it is also possible for users of desktop or laptop computers, as well as smartphones, to obtain pre-recorded video events from other sources.

The problem is that Client Device 200 must somehow stream its video content across the Internet to Virtual Broadcast Server 300, which may be many hops away across multiple ASNs. Uploader 280 addresses this problem via a proprietary "showering" protocol designed to avoid UDP packets being delayed or blocked at intermediate routers. In one embodiment, Uploader 280 is implemented via a dedicated smartphone app on Client Device 200, as opposed to relying on more limited client-side Javascript functionality.

To implement this showering protocol, Uploader 280 establishes a TCP/IP connection with Virtual Broadcast Server 300, and employs UDP "bursts" to deliver the largest IP packet sizes available ("maximum transmission unit" or MTU). Yet, continuous UDP streams (whether sent via a single router port or distributed across multiple router ports) will often be detected by intermediate routers as a "denial of service" (DOS) attack, and thus blocked. Moreover, such UDP streams may overflow a router's allocated memory (e.g., a FIFO queue) because routers typically allocate memory for UDP packets (as opposed to more common TCP packets) only while they are being received.

To address these obstacles, Uploader 280 not only distributes UDP packets among multiple ports (e.g., 6 ports in one embodiment), it also delays the packets sent on any individual port to avoid being detected as a DOS attack. In one embodiment, the delay on each port is long enough to avoid detection as a DOS attack, and long enough to enable routers to allocate sufficient memory, but short enough to provide sufficient bandwidth to deliver a video segment across multiple ASNs, and short enough to avoid being perceived as the end of a UDP stream (which would cause the router to stop allocating memory for UDP packets and essentially "throw them away").

As Uploader 280 delivers each video segment to Virtual Broadcast Server 300 in this manner, Virtual Broadcast Server 300 then generates a channel to redistribute this video content along Overlay Networks 100 as if it had been received from a more traditional CDN. In another embodiment, Virtual Broadcast Server 300 employs this proprietary showering protocol in the relatively infrequent scenarios in which it is the fallback point-of-origin source of a video segment for a client node whose current video segment did not arrive in time along the Overlay Networks 100.

Virtual Broadcast Server

Figure 3:
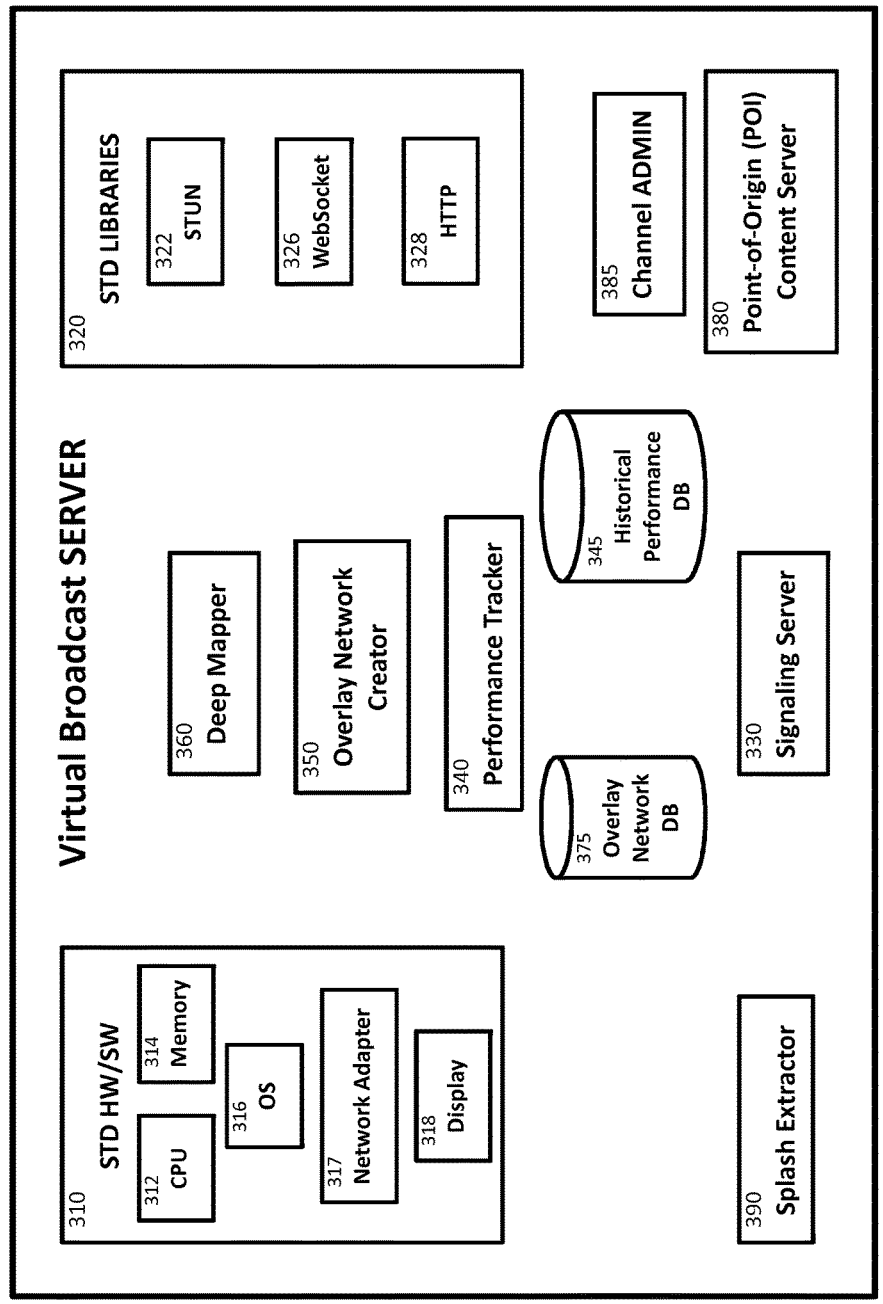
FIG. 3 is a block diagram illustrating one embodiment of key server-side components of a virtual broadcast server of the present invention.

FIG. 3 illustrates one embodiment of key server-side components of a Virtual Broadcast Server 300 of the present invention. As noted above, while the components of Virtual Broadcast Server 300 are illustrated in a single physical hardware server, the functionality of these components can be reallocated among multiple different physical hardware devices and different software modules without departing from the spirit of the present invention.

Virtual Broadcast Server 300 includes certain standard functionality, such as Standard HW/SW 310, found in most hardware servers—e.g., a CPU 312, Memory 314, Operating System 316, Network Adapter 317 and a Display 318. In certain embodiments, Virtual Broadcast Server 300 also leverages Standard Libraries 320, which may include, for example, (i) the STUN 322 protocol ("Session Traversal Utilities for NAT"), which facilitates the discovery of public IP addresses of Client Devices 200 behind a NAT firewall, so that client nodes can send and receive video to and from other client nodes, as well as establish connections with Virtual Broadcast Server 300; (ii) the WebSocket 326 protocol, which facilitates rapid two-way client-server communications over a single TCP/IP connection; and (iii) HTTP 328, which is employed for less-frequent standard communications with client web browsers, such as Standard HTML5 Web Browser 230.

Virtual Broadcast Server 300 need not support WebRTC 222 and Adaptive Streaming 224 standards because it is not a client node on the Overlay Networks 100, even though it continually analyzes performance metrics obtained from client nodes, and dynamically reconfigures the routing paths for the channels of video content distributed among those client nodes along the Overlay Networks 100.

Virtual Broadcast Server 300 serves as the "channel originator" point of origin for the Overlay Networks 100, in particular, for the Virtual Data Trunk overlay network. In one embodiment, POI Content Server 380 designates one or more nearby A nodes (preferably in its ASN, if possible) to issue HTTP requests for video segments. These A nodes effectively serve as the root of the Virtual Data Trunk overlay network, and push each video segment to other A nodes within and across ASNs, and ultimately to other nodes via the Swarm overlay networks within each ASN.

As will be described in greater detail below with reference to POI Content Server 380, such "channel origination" functionality does not require use of the standard WebRTC 222 and Adaptive Streaming 224 libraries which are targeted at browser-to-browser video streaming. As noted above, POI Content Server 380 also serves as the occasional alternative (fallback) source of video segments for client nodes who do not receive the current video segment in time along the Overlay Networks 100. Such client nodes issue HTTP requests to which POI Content Server 380 responds by sending them the requested video segment.

As also noted above, POI Content Server 380 serves as the point of origin for all video channels (in one embodiment), whether the video content is obtained from a Client Device 200 via Uploader 280 or from a more traditional CDN (and whether it is streamed to Virtual Broadcast Server 300 in real time, or provided in advance for streaming at a later time).

Channel Admin 385 is responsible for setting up and maintaining each channel, while POI Content Server 380 prepares the video content itself for streaming as a channel to client nodes. In one embodiment, Channel Admin 385 generates and maintains the channel webpage for delivery by POI Content Server 380 over the Internet, and use by Signaling Server 330 in responding to join requests from Client Devices 200 seeking to join a particular channel.

For support purposes, a "viewer support console" is established and maintained by Channel Admin 385 to support individual viewers whose Client Devices 200 are experiencing problems, as well as a "playout center" for live-monitoring of all video channels so that channel-specific and region-specific problems can be addressed (e.g., as support calls accrue from a particular geographic region). Real-time monitoring of "channel analytics" is also maintained by Channel Admin 385 to provide data useful for these support functions, as well as for the originators of video content (e.g., at a CDN). For example, analytics include real-time metrics regarding the current state of each video channel and the network nodes along the Overlay Networks 100, as well as last-mile and other problems relating to video bit rates, points of congestion, node latency, etc.

Finally, "channel administration" functionality is provided to manage the video channels and interface with Signaling Server 330 so that it has current information necessary to facilitate its communications with Client Devices 200 (e.g., regarding joining a channel, providing client-monitored performance metrics, obtaining routing and resolution or bit-rate changes for relay targets, etc.).

The remaining server-side functionality illustrated in FIG. 3, with the exception of Splash Extractor 390, will be described, for simplicity, in the context of a single channel of video content. Note, however, that this functionality is performed concurrently, in one embodiment, for multiple channels at any given time, and for a variety of digital content.

Before client nodes access a video channel, the video content is transcoded to create multiple lower-resolution streams of video segments. In one embodiment, POI Content Server 380 is implemented as an HTTP 228 server that can communicate with Standard HTML5 Web Browsers 230 within Client Devices 200. Unlike Signaling Server 330, which establishes WebSocket 225 connections with Client Devices 200 for frequent two-way communications (e.g., exchanging routing changes, performance data, etc.), POI Content Server 380 responds to relatively infrequent client HTTP 228 requests from Standard HTML5 Web Browsers 230 for manifest files, occasional video segments that did not arrive in time via Overlay Networks 100, etc.

As noted above, POI Content Server 380 also relies on the HTTP 228 protocol to implement its higher-bandwidth channel origination functionality—i.e., by responding to HTTP requests for video segments from nearby A nodes (at the root of the Virtual Data Trunk overlay network, typically in the same ASN as POI Content Server 380, or within one or two hops). In other embodiments, these video segments are pushed to those A nodes in accordance with WebRTC 222 and Adaptive Streaming 224 standards, or via other video streaming techniques (including the showering protocol used by Uploader 280 as discussed above).

In one embodiment, POI Content Server 380 transcodes video content into 3 different resolutions (1080p, 720p and 480p), while various other higher and lower resolutions are supported in other embodiments (e.g., 4K, 360VR, 180VR, 240p, etc.), including a single fixed resolution for all video content. If the original source video is provided at a lower resolution (e.g., 720p), then only 720p and 480p resolutions can be supported for that video channel. This functionality facilitates adaptive bit-rate streaming, whether initiated by client nodes (as discussed above) or by Virtual Broadcast Server 300 based upon an analysis of client performance metrics.

In one embodiment, POI Content Server 380 initiates a channel by responding to an HTTP request to provide all available versions (e.g., 3 different resolutions) of each video segment to one or more nearby nodes (typically A nodes) which initiate the pushing of each video segment along the Overlay Networks 100. In another embodiment, these nodes relay all versions to B nodes (and B:A nodes), and ultimately to C nodes, so that every client node may leverage Adaptive Streaming 224 capabilities. Nodes that relay multiple resolutions to other nodes are "polycasting" these multiple versions of a video segment to other client nodes via the Overlay Networks 100, as explained in greater detail below.

Note that, while POI Content Server 380 initiates a channel by providing video segments to one or more nearby nodes (in response to HTTP requests), all client viewing nodes effectively receive and view each video segment concurrently—i.e., they are all in sync, provided that each video segment traverses the Overlay Networks 100 before playback of the prior video segment has concluded. Because Client Devices 200 buffer at least 3 video segments in this embodiment, this buffer provides some "margin for error" should a video segment occasionally be delayed. Moreover, in another embodiment, the initiation of a channel can be delayed to provide additional buffering when POI Content Server 380 first starts "broadcasting" the channel. When a Client Device 200 issues a request for a video segment directly from fallback POI Content Server 380 (e.g., because the video segment did not arrive in time via the Overlay Networks 100), this buffer may be needed, for example, if that video segment crosses one or more ASNs.

As noted above, POI Content Server 380 also provides periodic manifest files in response to requests from Client Device 200. Although these manifest files are delivered via standard HTTP 328 protocols, they are relatively small and far less time critical than video segments. In one embodiment, each manifest file identifies the location of the next 8 video segments at various available bit rates. In this embodiment, the locations are the fallback locations on POI Content Server 380 because video segments are pushed to each Client Device 200 via the Overlay Networks 100.

Once a channel of video content has been prepared for streaming (starting with POI Content Server 380), Signaling Server 330 waits for join requests from Client Devices 200. Upon receiving a join request for that channel from a Client Device 200, Signaling Server 330 relies on the STUN 322 protocol to ensure that it can establish a WebSocket 326 connection through any NAT firewall that might be present on that Client Device 200. Moreover, by identifying the public IP address of that Client Device 200, it can provide that public IP address to other client nodes (e.g., for relaying a video segment to that Client Device 200).

Once a WebSocket 326 connection is established, the Client Device 200 provides Signaling Server 330 with information regarding its capabilities (e.g., OS, web browser and connection type—3G, 4G, WiFi, LAN, etc.) including, in one embodiment, whether Client Device 200 is a C node (e.g., assumed for cellular connections in this embodiment). Client Device 200 also provides its ASN location to Signaling Server 330, which will later be used to add Client Device 200 to the Overlay Networks 100.

In one embodiment, Signaling Server 330 prioritizes delivery of one or more initial video segments to Client Device 200 (via the Overlay Networks 100) so that it can begin playing the channel's video content as soon as possible. To initiate this process, it turns control over to Overlay Network Creator 350, which adds Client Device 200 to a Swarm overlay network within its ASN (e.g., by directing a B node within that ASN to relay video segments to Client Device 200). Note that Client Device 200 has still not yet been classified, and will not yet relay any video segments to other client nodes. But, by being part of Overlay Networks 100, Client Device 200 can start receiving video segments and playing the channel's video content, as well as collect client performance metrics, which will facilitate its classification.

Signaling Server 330 then obtains (via its WebSocket 326 connection) the upstream and downstream bandwidth of Client Device 200. Note that this metric is not terribly useful, as the connection may cross multiple ASNs (even though Signaling Server 330 knows the ASN location of Client Device 200). A more relevant metric will relate to communications between Client Device 200 and other client nodes within its own ASN.

Upon receiving client performance information (collected by Performance Monitor 240 on Client Device 200) from Client Device 200 (and from other client nodes), Signaling Server 330 forwards that information to Performance Tracker 340 for initial analysis and subsequent use by Overlay Network Creator 350 and Deep Mapper 360 in dynamically reclassifying client nodes and reconfiguring Overlay Networks 100 for the next video segment, as explained below. Performance Tracker 340 monitors the performance of each client node and determines whether the client node is still "alive." For example, if Client Device 200 has closed the connection and left the channel, or does not respond to a "ping" within a threshold amount of time, it will be deemed to have left the channel (whether intentionally, or as the result of a hardware or software failure). Performance Tracker 340 also converts the client performance metrics into an appropriate format for storage in Historical Performance DB 345, and use by Overlay Network Creator 350 and Deep Mapper 360.

In one embodiment, Overlay Network Creator 350 is also responsible, with the assistance of Deep Mapper 360, for the continuous process of evaluating current and historical client performance metrics (maintained in Historical Performance DB 345) and dynamically, for each video segment (i) reclassifying client nodes and (ii) optimizing routing paths by generating and reconfiguring the Overlay Networks 100, including the Virtual Data Trunk overlay network (for relaying the video segment among A nodes, within and across ASNs) and the Swarm overlay networks (for relaying the video segment from each A node within an ASN, to certain other B:A, B and C nodes within that ASN). The topology of the Overlay Networks 100 is maintained in Overlay Network DB 375, for use by Overlay Network Creator 350 and Deep Mapper 360.

With respect to the performance metrics received from newly added Client Device 200, Overlay Network Creator 350 utilizes those metrics to initially classify Client Device 200. In one embodiment, this process is also used to potentially reclassify client nodes for every video segment (not simply when they join the channel). While client nodes are not typically reclassified very frequently, a client may experience a temporary drop in bandwidth (e.g., from a home microwave or other interference). Also, as more A nodes are required (e.g., for redundancy, or due to client nodes that leaves a channel), B:A nodes may be upgraded to A nodes. Other problems detected within an ASN, or across ASNs, may also require that certain nodes be reclassified.

Overlay Network Creator 350 allocates to Client Device 200 incoming and outgoing slots (i.e., network ports) so that it can receive chunks of video segments (via incoming slots) pushed from other client nodes, and can relay (push) those chunks of video segments (via outgoing slots) to other client nodes. While the WebRTC 224 standard supports 256 incoming and outgoing ports (slots), only a single incoming slot is allocated in one embodiment (to maximize the quality of video content that can be played on Client Device 200) and a maximum of 8 outgoing slots are allocated (to maximize throughput along the Overlay Networks 100 and support a broad range of Client Devices 200 and limited-bandwidth connections). As noted above, A nodes are allocated 4 outgoing slots for relaying video segments to other A nodes across ASN Peering Points, and 4 outgoing slots for relaying video segments to other A nodes within its ASN. As will be explained below, not all allocated slots will necessarily be used at any given point in time.

Overlay Network Creator 350 analyzes the downstream and upstream bandwidth of Client Device 200 to facilitate the classification process. As noted above, if Client Device 200 joins via a cellular connection (3G, 4G or even LTE), it is automatically deemed to be too unreliable to relay video segments, and is therefore classified as a C node. In other embodiments, such an automatic classification may be limited to certain cellular connections (e.g., 3G), or eliminated altogether.

In one embodiment, Overlay Network Creator 350 employs categories of typical downstream/upstream bandwidth (in Mbps) to facilitate further classification, including: (1) LAN connections (e.g., 100/100), (2) Fiber connections (100/50), (3) ADSL connections (100/20), Cable connections (100/10) and WiFi connections, which vary greatly). In this embodiment, if Client Device 200 is not already deemed a C node, and has an upstream bandwidth of at least 50 Mbps, it is initially categorized as an A node (or as a B:A node if Deep Mapper 360 indicates that no additional A nodes are required in its ASN). Otherwise, it will be categorized as a B node.

As will be discussed below, Overlay Network Creator 350 further analyzes the upstream bandwidth of Client Device 200 (in one embodiment) to calculates the number of available outgoing slots it can utilize before it determines the extent to which (if any) it should dynamically reconfigure Overlay Networks 100. It also determines the extent to which Client Device 200 is capable of receiving and/or polycasting multiple resolutions.

In one embodiment, the full downstream bandwidth of a client node is utilized for its single incoming slot, while only ⅓ of its upstream bandwidth is utilized for relaying video segments among its outgoing slots. Its full upstream bandwidth is not utilized, as the relaying of video segments may interfere with TCP/IP and other connections that Client Device 200 is using for other applications.

Overlay Network Creator 350 analyzes the downstream bandwidth of Client Device 200 (even if classified as a C node) to determine the number of resolutions it can support via its single incoming slot. For example, if 1080p requires a bit rate of 3 Mbps, and 720p requires a bit rate of 1.5 Mbps and 480p requires a bit rate of 500 Kbps, then Client Device 200 would require a downstream bandwidth of at least 5 Mbps to support all 3 resolutions, at least 4.5 Mbps to support 1080p and 720p, at least 3 Mbps to support 1080p only, at least 2 Mbps to support 720p and 480p, at least 1.5 Mbps to support 720p only, and at least 500 Kbps to support 480p only. In one embodiment, bit rates lower than 500 Kbps will not be supported. In other embodiments, lower resolutions may be supported, and other techniques (e.g., greater compression, different video formats, etc.) may be employed to lessen the bandwidth requirements.

As noted above, in one embodiment, A, B:A and B nodes may also be deemed polycasting nodes that can relay multiple resolutions to other nodes via one or more of its outgoing slots. In this regard, Overlay Network Creator 350 analyzes the upstream bandwidth of Client Device 200 to determine the number of resolutions it can relay to other client nodes.

Because a client node can utilize only ⅓ of its upstream bandwidth in this embodiment, Client Device 200 would require an upstream bandwidth of at least 15 Mbps (per outgoing slot) to polycast all 3 resolutions, at least 13.5 Mbps (per outgoing slot) to polycast 1080p and 720p, at least 9 Mbps (per outgoing slot) to send 1080p only, at least 6 Mbps (per outgoing slot) to polycast 720p and 480p, at least 4.5 Mbps (per outgoing slot) to relay 720p only, and at least 1.5 Mbps (per outgoing slot) to relay 480p only.

Client Device 200 cannot relay a resolution that it does not receive. Moreover, the polycasting capabilities of Client Device 200 are considered in conjunction with the ability of other client nodes to receive multiple resolutions, as explained below. But, as noted above, Client Device 200 employs Adaptive Streaming 224 implementations to request lower or higher resolution versions of video segments as it experiences significant changes in its bandwidth. If it receives multiple different resolutions of a video segment, it will simply play the highest-resolution it received.

Assuming Client Device 200 is not a C node, Overlay Network Creator 350 calculates the number of available outgoing slots it can utilize by analyzing its upstream bandwidth, as well as considering the extent to which it can polycast multiple resolutions. For example, if Client Device 200 is classified as an A node with a LAN connection having an upstream bandwidth of 100 Mbps, it can utilize only about 6 outgoing slots for polycasting video segments both within its ASN and across ASNs. In this embodiment, Overlay Network Creator 350 would allocate 4 slots for polycasting to other A nodes across ASNs (giving these inter-ASN slots priority), leaving 2 remaining slots for polycasting to other A nodes within its ASN. In other embodiments, these allocations could of course vary without departing from the spirit of the invention.

Similarly, if Client Device 200 is classified as a B:A or B node with a cable connection having an upstream bandwidth of 10 Mbps, it could utilize only 1 outgoing slot for polycasting 720p and 480p resolutions, or sending only 1080p. In one embodiment, priority is given to higher-quality resolutions (to the extent nodes can receive that resolution), and thus one slot would be allocated for 1080p only. Here too, these allocations could vary without departing from the spirit of the invention.

Having classified Client Device 200, and determined the number of slots than can be utilized (including polycasting multiple resolutions), Overlay Network Creator 350 then determines the extent to which it will dynamically reconfigure the Overlay Networks 100 to optimize routing paths. If Client Device 200 is an A node, then Overlay Network Creator 350 will first obtain from Deep Mapper 360 the congestion levels for each inter-ASN path between A nodes (as discussed in greater detail below), and will then dynamically reconfigure at least part of the Virtual Data Trunk overlay network to incorporate Client Device 200.

For example, given a set of weighted paths (each path having a "congestion level" weighting), Overlay Network Creator 350 employs standard path-finding techniques to determine the optimal path to distribute a video segment among the A nodes (analogous, for example, to GPS navigation routing). Note, however, that this process is slightly complicated by the use of multiple relay slots—e.g., 4 outgoing slots for A nodes relaying to A nodes within an ASN, and 4 outgoing slots for A nodes relaying to A nodes across an ASN Peering Point. Yet, this is only a slight variation of the simplest case in which an A node has only 1 outgoing slot. In other words, Overlay Network Creator 350 tracks the number of open (unused) slots during the generation or reconfiguration of the Virtual Data Trunk overlay network, and stops assigning a particular A node as a relay source once it no longer has any unused open slots.

If Client Device 200 is a B:A or B node, Overlay Network Creator 350 dynamically reconfigures some or all of the intra-ASN Swarm overlay networks in the ASN in which Client Device 200 resides. Note that, if there are multiple A nodes within that ASN, their routes among each other will be determined as part of the Virtual Data Trunk overlay network. In one embodiment, only one A node will be utilized to create a Swarm overlay network (if sufficient slots are available), while in other embodiments, the other nodes can be allocated equally among the multiple A nodes, or distributed based on relative upstream bandwidth or other metrics.

With respect to any particular A nodes, and remaining B, B:A and C nodes within an ASN, these nodes are first ranked based on their classification (i.e., B:A, then B, then C), and then based on their relative bandwidth (i.e., number of available slots that can be utilized, as described above). Note that the Swarm overlay network is a hierarchy in this embodiment, given that each node has only a single feeder node. Similar techniques can be employed for non-hierarchical "mesh" swarms in other embodiments.

In this hierarchical Swarm embodiment, the process begins with the root A node, which will have a certain number of outgoing slots that can be utilized (e.g., 2 outgoing slots). Those slots will be routed to the next level of the hierarchy—e.g., the 2 B:A nodes with the highest number of available slots that can be utilized. Once these paths are determined, the available outgoing slots of those nodes will be routed to the remaining B:A nodes with the highest number of available slots. This process continues down the hierarchy (through the B nodes, and finally the C nodes) until all paths have been determined.

Note that the length of a chain beneath any client node (e.g., 100 client nodes, each with a single outgoing slot) is of relatively little concern given the relatively high speed (well under 1 ms) of a relay between nodes within an ASN. Given a 1-second video segment, chains of hundreds of nodes can still be accommodated (though they would be rare, given that many nodes within an ASN will likely support multiple outgoing slots). In the event that all nodes could not be included in a Swarm (e.g., if C nodes and B nodes with 0 available slots remained unaccounted for), then there would be a need for additional nodes with open slots in that ASN, which would be allocated as they became available. In the interim, such nodes would be directed to request video segments from the POI Content Server 380.

Before turning to Deep Mapper 360, which predicts and quantifies the congestion levels across ASN Peering Points (e.g., for the next minute), it is helpful to understand the limitations of BGP routing protocols to appreciate the significance of ASN Peering Point congestion. BGP routers determine congestion at "routing time" and have no predictive abilities. They are aware only of their own routers, and the latency "1 hop away" across an ASN Peering Point. They are unaware of the number of hops or latency to any ultimate destination, which may be multiple hops away across multiple ASN Peering Points. Given a choice of multiple ASN Peering Points, they essentially choose the one with the most available bandwidth at the moment (i.e., the one with an open slot and the lowest latency 1 hop away).

By contrast, Deep Mapper 360 leverages its knowledge of the underlying architecture of the Internet. In one embodiment, Deep Mapper 360 maintains an ASN Interconnection Map of the Internet (including ASNs and their various Peering Point interconnections), as roughly illustrated in FIG. 1. This map does not change frequently, though it is monitored, in one embodiment, every 5 minutes to capture such infrequent changes.

The Overlay Networks 100 constructed on top of these ASNs are, however, analyzed frequently (e.g., via client-side monitoring as discussed above), and potentially reconfigured every video segment (e.g., every second in one embodiment) by Virtual Broadcast Server 300. In practice, however, Overlay Networks 100 are actually modified only when warranted—e.g., not only when new nodes join or leave the channel, but also when sufficient problems are detected (based upon current and historical information maintained in Historical Performance DB 345).

For example, multiple internal "congestion thresholds" are employed in one embodiment. Upon initial detection of a relatively low threshold of congestion specific to a particular Client Device 200 or within an ASN, Overlay Network Creator 350 merely "marks" the Client Device 200 or ASN, and waits to see if the problem recurs (e.g., on the next video segment). If so, it may lower the resolution (and thus bit rate) of the next video segment relayed to that client node (or all client nodes within that "problem" ASN). Eventually, if the problem gets worse (e.g., exceeding a higher congestion threshold), then a portion of the Overlay Networks 100 (e.g., a subset IP range within an ASN) may be dynamically reconfigured. Finally, an entire ASN, or perhaps the Virtual Data Trunk overlay network itself, may require dynamic reconfiguration.

In any event, the goal of these congestion thresholds is to identify and correct problems proactively, before they degenerate into more significant problems causing video segments to be lost, or even causing client nodes to resort to obtaining a video segment from the fallback location of the POI Content Server 380.

By maintaining an awareness of the ASN Interconnection Map of the Internet, and the ASN location of the nodes on the Overlay Networks 100, and monitoring in real time the current and historical performance of those nodes, Deep Mapper 360 minimizes the likelihood that any client node will unnecessarily relay a video segment to a distant client node (e.g., many hops away across multiple ASN Peering Points). For example, as an initial matter in one embodiment, the Virtual Data Trunk overlay network will tend to route video segments (whenever possible) from one A node to another A node in the same ASN or in a nearby ASN across a single ASN Peering Point.

However, not all single hops are created equally. For example, Deep Mapper 360 may "learn" over time (based upon client performance metrics maintained in Historical Performance DB 345) that a Peering Point between "ASN 1" and "ASN 2" is becoming congested, and may "predict" that a 2-hop route from "ASN 1" to "ASN 3" to "ASN 2" is actually faster than the current 1-hop route (or will be faster in the very near future based upon recent and historical trends). By quantifying Peering Point congestion based upon actual current and historical performance of A nodes across Peering Points, Deep Mapper 360 can facilitate dynamic reconfiguration of the topology of the Virtual Data Trunk overlay network—potentially for every video segment, or at least when Peering Point congestion necessitates such changes (based on internal thresholds).

In one embodiment, Deep Mapper 360 quantifies congestion with respect to each pair of A nodes (whether they reside in the same ASN or in different ASNs), employing a scale from 1 to 10, with 1 being the lowest level of predicted near-term congestion and 10 being the highest. As noted above, Overlay Network Creator 350 utilizes this congestion level "score" to compare different potential routes among A nodes and determine the most efficient route (i.e., the lowest "weighted hop" route). As a result, A nodes that are most "distant" (in weighted hops) from POI Content Server 380 will minimize the amount of time necessary for a video segment to traverse the Virtual Data Trunk overlay network to such A nodes from POI Content Server 380.

In one embodiment, for each pair of A nodes, Deep Mapper 360 generates a predicted congestion level score for each route from one A node to the other, and then selects the lowest congestion level score to be applied to that pair of A nodes, which it returns to Overlay Network 350. In other embodiments, Deep Mapper 360 generates a different function of those predicted congestion level scores (for each route from one A node to the other), such as an average, a median, etc.).

Deep Mapper 360 is, in one embodiment, a deep learning engine that continuously analyzes the performance metrics maintained in Historical Performance DB 345, and predicts (e.g., one minute into the future) the level of congestion across ASN Peering Points. It should be noted that, like any deep learning engine, Deep Mapper 360 employs multiple non-linear transformations to model the behavior of ASN Peering Points, with respect to traffic among A nodes across those Peering Points.

As noted above, it cannot effectively monitor the bulk of the Internet traffic that crosses those Peering Points, but only the effect over time that such traffic has on the inter-ASN hops between A nodes across those Peering Points. As more performance metrics are obtained, the better it can predict the time required for such inter-ASN hops, which is then quantified as a relative congestion level (e.g., as compared to intra-ASN hops which are typically far less congested, though also monitored in this embodiment).

Because the congestion level of Peering Points is so dynamic, such predictions can only be accurate for a short period of time. But, given that this analysis is performed on a continuous basis, and may change for the next 1-second video segment, it is not critical that the prediction be accurate for a long period of time.

In one embodiment, Deep Mapper 360 initially quantifies ASN Peering Points based on very coarse information (i.e., before a great deal of client performance metrics are obtained). For example, if an ASN has 1000 Peering Points, it can be assumed to be a backbone that is likely much faster than another ASN with 6 Peering Points. As more client performance metrics are obtained, these ASN Peering Point congestion levels will become more accurate. In another embodiment, multiple "learning nodes" are deployed to "jump start" a new channel. These learning nodes are send-only nodes that do not view the video, but are deployed solely to provide client performance information quickly, so that Deep Mapper 360 can begin to make more accurate predictions earlier than would otherwise be the case.

Moreover, in one embodiment, Deep Mapper 360 also considers intra-ASN congestion, as this can suggest the need, for example, for additional A nodes within an ASN, and thus the creation of additional Swarm overlay networks. For example, if many client nodes within an ASN are gradually taking longer to obtain video segments over time, Deep Mapper 360 marks the ASN to indicate that additional A nodes are required, and Overlay Network Creator 350 may "promote" one or more B:A nodes to A nodes, resulting in a partial reconfiguration of the Virtual Data Trunk overlay network, and ultimately requiring new Swarm overlay networks within the ASN. In another embodiment, Deep Mapper 360 applies deep learning techniques within each ASN, and assists Overlay Network Creator 350 in generating intra-ASN Swarm overlay networks.

Thus, Overlay Network Creator 350 and Deep Mapper 360 work together to establish routes among client nodes (via Overlay Networks 100) that are based on the Internet's underlying architecture (ASN Interconnection Map) and the ASN location of client nodes overlaid on top of that architecture, in order to minimize relays of video segments across unnecessarily distant routes (i.e., across multiple ASN Peering Points). Moreover, Overlay Network Creator 350 and Deep Mapper 360 also work together to continuously analyze real-time client performance metrics obtained by Client Devices 200, and to dynamically reconfigure Overlay Networks 100 in the event such metrics reveal significant problems (often due to congestion at ASN Peering Points). As a result, the Internet's QoS volatility can be monitored, and the effects on client nodes of congestion (particularly at ASN Peering Points) can be minimized by dynamically rerouting around such problems "before they occur" (based on the predicted congestion levels generated by Deep Mapper 360).

In one embodiment, Virtual Broadcast Server 300 includes a Splash Extractor 390 search engine for the purpose of identifying trending video events ("Splashes"), and enabling users to search among the domain of such events and immediately stream a desired Splash result as a video channel from POI Content Server 380 (where such channel was not otherwise available from Virtual Broadcast Server 300.

In one embodiment, Splash Extractor 390 collects data continuously from multiple news sources—e.g., via APIs to Twitter, RSS Feeds, Reddit, and tens of thousands of online magazines. On average, thousands of distinct "current events" are revealed in such sources every hour. Splash Extractor 390 employs novel automated methods to identify such trending events (Splashes) and locate and extract related videos that can be obtained and streamed via POI Content Server 380.

Splash Extractor 390 identifies "deviations from the norm" in order to detect Splashes. For example, a baseline is developed (without requiring normalized data) by employing, for example, a standard Levenshtein comparison algorithm among the domain of news sources. On average, no more than a few sources will discuss the same "topic" (i.e., a collection of keywords) within a short period of time, unless and until a particular topic is in fact trending. At that point (e.g., when 15 or more sources discuss the same topic within a short period of time), that topic is identified as a deviation, and thus a Splash.

Splash Extractor 390 then extracts the "most important" keywords from those sources (e.g., 40 keywords in one embodiment)—in one embodiment, by employing standard neural network techniques to learn and predict the distinct keywords from the "splash-related" articles. These keywords are then categorized (e.g., as news, sports, etc.) and ranked by frequency.

Splash Extractor 390 then uses those keywords to search social media for videos relating to each Splash, and indexes the related text associated with those potential Splash video channels. Users can then search into that index, or simply browse the categories of Splash video events. Upon selecting a result (whether searched or browsed), the user can immediately stream the desired video. In one embodiment, the user is simply linked to the current source of the video, while in another embodiment, the video is obtained via Virtual Broadcast Server 300, and streamed from POI Content Server 380 (useful, for example, if large numbers of concurrent users request the same Splash video channel).

Dynamic Video Streaming Process

Figure 4:
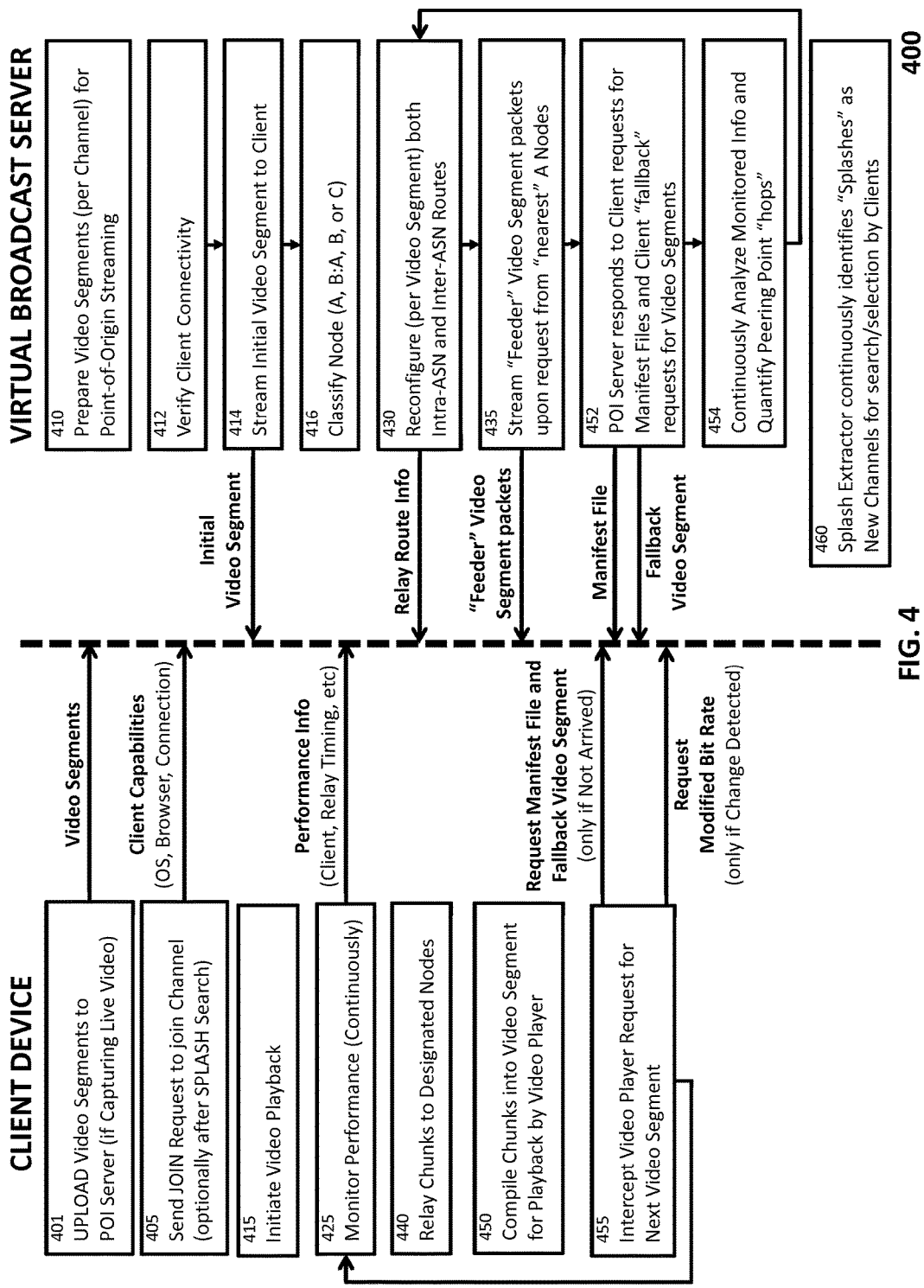
FIG. 4 is a flowchart illustrating one embodiment of a dynamic video streaming process of the present invention.

Having discussed key client-side and server-side components of the virtual broadcast system of the present invention, flowchart 400 of FIG. 4 illustrates how these components interact dynamically. In other words, flowchart 400 illustrates one embodiment of a dynamic streaming process of the present invention implemented by such components. It should be noted that, because much of this process is event-driven and not linear, flowchart 400 illustrates steps from the perspective of the interaction between client-side and server-side functionality.

Step 401 illustrates the process performed by Uploader 280 (and described above), in which a video event is either captured by a client node (e.g., a smartphone camera 219 on Client Device 200) or generated digitally or obtained from an external source. In any event, the client (e.g., Client Device 200) then streams video segments of that video event (whether captured live or pre-recorded) to Virtual Broadcast Server 300.

Whether video events are obtained from clients or from a more traditional CDN (and whether they are pre-recorded or streamed live), Virtual Broadcast Server 300, in step 410, prepares each video channel for live streaming from POI Content Server 380, as discussed above. At this point, in one embodiment, a channel webpage is generated and eventually encountered by a potential client node. When a user of a Client Device 200 clicks on a desired channel, a join request is sent to Signaling Server 330, along with client capabilities (such as the type of operating system, browser, connection, etc.). Alternatively, a user of Client Device 200 may encounter a trending Splash video event (as discussed above) and select that video event (in step 410) for streaming as a video channel from POI Content Server 380.

In step 412, Signaling Server 330 verifies client connectivity to the channel (e.g., by employing the STUN 322 protocol to identify the client's public IP address), and then establishes a WebSocket 326 connection through any NAT firewall that might be present on the client, and later provides that public IP address to other client nodes for relaying a video segment to that client. Signaling Server 330 then turns control over to Overlay Network Creator 350, which adds the (not yet classified) client as a node on the Overlay Networks 100, from which initial video segments will be pushed to the client (in step 414) so that the user can immediately begin viewing the video channel, in step 415.

Signaling Server 330 then, in step 416, classifies Client Device 200 as an A, B:A, B or C node, and, in step 430, employs both Overlay Network Creator 350 and Deep Mapper 360 to dynamically reconfigure the inter-ASN (Virtual Data Trunk) and intra-ASN (Swarm) Overlay Networks 100 to incorporate Client Device 200 in the network topology. Signaling Server 330 then provides the relevant route information to other client nodes to begin relaying video segments to Client Device 200.

POI Content Server 380, in step 435, then responds to HTTP requests from nearby nodes (typically A nodes) to stream video segments to those nodes as the point of origin of the video channel along the current (reconfigured) Overlay Networks 100, each video segment being relayed from node to node until it is relayed to and viewed by Client Device 200.

While Client Device 200 is receiving chunks and compiling them, in step 450, for viewing each video segment of the channel (and potentially also relaying chunks to other designated client nodes, in step 440), it is also monitoring its performance in step 425, as discussed above with respect to Performance Monitor 240, and providing client performance metrics to Signaling Server 330. In addition, as each video segment is requested, these requests are intercepted in step 455 (by client Javascript code in Receiver 250, in one embodiment) because the video segments are being pushed to Client Device 200 along the Overlay Networks 100, as discussed above. The arrow from step 455 to step 425 simply indicates that the monitoring process in step 425 is a continuous one, concurrent with the receipt, viewing and relaying of chunks of video segments.

As also noted above, Client Device 200 periodically initiates HTTP requests for manifest files (e.g., containing the locations of the next 8 video segments) from POI Content Server 380, even though video segments are being pushed to Client Device 200 from other client nodes. Occasionally, if a video segment does not arrive in time, Client Device 200 will request that video segment directly from POI Content Server 380 as a fallback location. Moreover, on occasion, in accordance with Adaptive Streaming 224 standards, Client Device 200 may also contact POI Content Server 380 to request a modified bit rate (e.g., upon detecting a change in its performance levels) for subsequent video segments. As noted above, however, Receiver 250 may well detect such need earlier, and contact Virtual Broadcast Server 300 to effect such changes via the Overlay Networks 100, directing a feeding client node to push lower or higher resolution video segments to Client Device 200 automatically (i.e., not in response to its request).

In step 452, POI Content Server 380 responds to such HTTP requests, and delivers the requested manifest files and fallback video segments to Client Device 200. As noted above, changes in bit rates are addressed via the Overlay Networks 100 (and in step 430), resulting in lower or higher resolution video segments being pushed to Client Device 200.

Step 454 encompasses the continuous process (performed for each video segment, in one embodiment, and described in detail above) performed by Performance Tracker 340, Overlay Network Creator 350 and Deep Mapper 360. In this step 454, client performance information is continuously updated and, if necessary, in step 430 (as indicated by the arrow from step 454 to step 430), Overlay Networks 100 are dynamically reconfigured, and new routing information is provided to relevant relay nodes via Signaling Server 330.

Finally, in step 460, Splash Extractor 390 continuously identifies trending Splash video events, which users of Client Devices 200 can browse or search for, and then stream for immediate viewing as discussed above.

The present invention has been described herein with reference to specific embodiments as illustrated in the accompanying drawings. It should be understood that, in light of the present disclosure, additional embodiments of the concepts disclosed herein may be envisioned and implemented within the scope of the present invention by those skilled in the art.

The invention claimed is:

1. A virtual broadcast server adapted to route each of a plurality of segments of digital content to a plurality of client nodes of an underlying network for concurrent playback of the segment by the plurality of client nodes, the virtual broadcast server comprising:
   (a) an overlay network database adapted to store an overlay network topology representing a current state of an overlay network built on top of the underlying network, wherein the overlay network topology includes:
      (i) each of the plurality of client nodes, each client node being a node of both the overlay network and the underlying network, and each client node being a destination client node adapted to receive the segment for concurrent playback of the segment by the destination client nodes, and
      (ii) a set of routing paths each segment traverses as it is relayed among the plurality of client nodes to facilitate concurrent playback of the segment by the destination client nodes, wherein each routing path is defined by a feeding client node that relays the segment to a destination client node;
   (b) a performance tracker adapted to monitor metrics from network traffic among the plurality of client nodes along the overlay network;
   (c) a learning engine adapted to predict congestion levels with respect to corresponding routing paths within the overlay network topology based upon the metrics monitored by the performance tracker; and
   (d) an overlay network creator adapted to:
      (i) determine whether a predicted congestion level with respect to a first routing path exceeds a predefined threshold, the first routing path defined by a first feeding client node and a first destination client node, and, if so,
      (ii) reconfigure a subset of the overlay network by replacing the first routing path with a second routing path, wherein the second routing path has a corresponding predicted congestion level that does not exceed the predefined threshold, and wherein the second routing path is defined by a second feeding client node that relays segments to the first destination client node.

2. The virtual broadcast server of claim 1, wherein the underlying network is the Internet, and the segments of digital content are ordered segments of video content concurrently streamed to the plurality of client nodes.

3. The virtual broadcast server of claim 1, wherein the metrics include the ASN location of each of the plurality of client nodes.

4. The virtual broadcast server of claim 1, wherein the learning engine predicts congestion levels based in part upon historical trends detected from analyses of the metrics over time.

5. A method adapted to route each of a plurality of segments of digital content to a plurality of client nodes of an underlying network for concurrent playback of the segment by the plurality of client nodes, the method comprising the following steps:
   (a) storing an overlay network topology representing a current state of an overlay network built on top of the underlying network, wherein the overlay network topology includes:
      (i) each of the plurality of client nodes, each client node being a node of both the overlay network and the underlying network, and each client node being a destination client node adapted to receive the segment for concurrent playback of the segment by the destination client nodes, and
      (ii) a set of routing paths each segment traverses as it is relayed among the plurality of client nodes to facilitate concurrent playback of the segment by the destination client nodes, wherein each routing path is defined by a feeding client node that relays the segment to a destination client node;
   (b) monitoring metrics from network traffic among the plurality of client nodes along the overlay network;
   (c) predicting congestion levels with respect to corresponding routing paths within the overlay network topology based upon an analysis of the metrics;
   (d) determining whether a predicted congestion level with respect to a first routing path exceeds a predefined threshold, the first routing path defined by a first feeding client node and a first destination client node; and, if so,
   (e) reconfiguring a subset of the overlay network by replacing the first routing path with a second routing path, wherein the second routing path has a corresponding predicted congestion level that does not exceed the predefined threshold, and wherein the second routing path is defined by a second feeding client node that relays segments to the first destination client node.

6. The method of claim 5, wherein the underlying network is the Internet, and the segments of digital content are ordered segments of video content concurrently streamed to the plurality of client nodes.

7. The method of claim 5, wherein the metrics include the ASN location of each of the plurality of client nodes.

8. The method of claim 5, wherein the predicted congestion levels are based in part upon historical trends detected from analyses of the metrics over time.

9. A client node that is one of a plurality of client nodes of an underlying network, the plurality of client nodes adapted for concurrent playback of each of a plurality of segments of digital content by the plurality of client nodes, the client node comprising:
 (a) a receiver adapted to receive each segment along an overlay network built on top of the underlying network;
 (b) a content player adapted for playback of each received segment concurrently with playback of that segment by each of the plurality of client nodes;
 (c) a performance monitor adapted to generate metrics from network traffic among the plurality of client nodes along the overlay network; and
 (d) a relayer adapted to receive routing information designating one or more destination client nodes to which the client node will relay subsequently received segments, and adapted to relay the subsequently received segments to the designated destination client nodes, wherein:
  (i) the designated client nodes are generated based upon predicted congestion levels determined from the metrics,
  (ii) each predicted congestion level is determined with respect to a corresponding routing path, and
  (iii) each routing path is defined by the client node as a feeding client node that relays segments to one of the destination client nodes.

10. The client node of claim 9, wherein the underlying network is the Internet, and the segments of digital content are ordered segments of video content concurrently streamed to the plurality of client nodes.

11. The client node of claim 9, wherein the metrics include the ASN location of the client node.

12. The client node of claim 9, wherein the predicted congestion levels are based in part upon historical trends detected from analyses of the metrics over time.

13. A method, performed by a client node that is one of a plurality of client nodes of an underlying network, the plurality of client nodes adapted for concurrent playback of each of a plurality of segments of digital content by the plurality of client nodes, the method comprising the following steps:
 (a) receiving each segment along an overlay network built on top of the underlying network;
 (b) playing each received segment concurrently with the playback of that segment by each of the plurality of client nodes;
 (c) generating metrics from network traffic among the plurality of client nodes along the overlay network;
 (d) receiving routing information designating one or more destination client nodes to which the client node will relay subsequently received segments, wherein
  (i) the designated client nodes are generated based upon predicted congestion levels determined from the metrics,
  (ii) each predicted congestion level is determined with respect to a corresponding routing path, and
  (iii) each routing path is defined by the client node as a feeding client node that relays segments to one of the destination client nodes;
 and
 (e) relaying the subsequently received segments to each of the designated destination client nodes.

14. The client node of claim 13, wherein the underlying network is the Internet, and the segments of digital content are ordered segments of video content concurrently streamed to the plurality of client nodes.

15. The client node of claim 13, wherein the metrics include the ASN location of the client node.

16. The client node of claim 13, wherein the predicted congestion levels are based in part upon historical trends detected from analyses of the metrics over time.

* * * * *